United States Patent
Boudreau et al.

(10) Patent No.: US 10,172,098 B2
(45) Date of Patent: Jan. 1, 2019

(54) POWER CONTROL FOR MITIGATING DEVICE-TO-DEVICE INTERFERENCE TO ADJACENT NETWORKS

(71) Applicant: Telefonaktiebolaget L M Ericsson (publ), Stockholm (SE)

(72) Inventors: Gary Boudreau, Kanata (CA); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 350 days.

(21) Appl. No.: 14/722,926

(22) Filed: May 27, 2015

(65) Prior Publication Data

US 2015/0351044 A1    Dec. 3, 2015

Related U.S. Application Data

(60) Provisional application No. 62/004,375, filed on May 29, 2014.

(51) Int. Cl.

| | |
|---|---|
| H04L 12/26 | (2006.01) |
| H04W 52/24 | (2009.01) |
| H04W 72/04 | (2009.01) |
| H04W 72/08 | (2009.01) |
| H04W 76/23 | (2018.01) |
| H04W 52/38 | (2009.01) |

(52) U.S. Cl.
CPC ....... *H04W 52/243* (2013.01); *H04W 52/383* (2013.01); *H04W 72/0473* (2013.01); *H04W 72/082* (2013.01); *H04W 76/23* (2018.02)

(58) Field of Classification Search
CPC ............. H04W 52/243; H04W 52/383; H04W 72/0473; H04W 72/082
See application file for complete search history.

(56) References Cited

U.S. PATENT DOCUMENTS

| | | | |
|---|---|---|---|
| 8,290,532 B1 * | 10/2012 | Goyal ................. | H04W 52/146 370/318 |
| 2009/0325625 A1 * | 12/2009 | Hugl ..................... | H04W 52/16 455/522 |

(Continued)

FOREIGN PATENT DOCUMENTS

| | | |
|---|---|---|
| EP | 2 688 346 A1 | 1/2014 |
| WO | WO 2008/034023 A1 | 3/2008 |

(Continued)

OTHER PUBLICATIONS

PCT Notification of Transmittal of the International Search Report and the Written Opinion of the International Searching Authority, or the Declaration for International Application No. PCT/IB2015/054040, 13 pages, dated Aug. 27, 2015.

*Primary Examiner* — Bo Hui A Zhu

(57) ABSTRACT

A method in a network node is disclosed. The method comprises determining a number of simultaneous device-to-device transmissions by a plurality of device-to-device capable wireless devices, comparing the determined number of simultaneous device-to-device transmissions to one or more threshold values, and determining a power control method from among a plurality of power control methods based at least in part on the comparison of the determined number of simultaneous device-to-device transmissions by the plurality of device-to-device capable wireless devices to the one or more threshold values.

32 Claims, 11 Drawing Sheets

(56) References Cited

U.S. PATENT DOCUMENTS

| | | | |
|---|---|---|---|
| 2011/0207499 A1* | 8/2011 | Liu | H04W 52/146 |
| | | | 455/522 |
| 2015/0124737 A1* | 5/2015 | Lee | H04W 52/28 |
| | | | 370/329 |
| 2015/0180635 A1* | 6/2015 | Fujishiro | H04L 1/1854 |
| | | | 370/329 |
| 2015/0257113 A1* | 9/2015 | Prytz | H04W 52/383 |
| | | | 370/329 |
| 2016/0007304 A1* | 1/2016 | Morita | H04W 52/367 |
| | | | 370/311 |

FOREIGN PATENT DOCUMENTS

| | | |
|---|---|---|
| WO | WO 2014/046579 A1 | 3/2014 |
| WO | WO 2014/129450 A1 | 8/2014 |

* cited by examiner

POWER CONTROL FOR MITIGATING DEVICE-TO-DEVICE INTERFERENCE TO ADJACENT NETWORKS

PRIORITY

This application claims the benefit under 35 U.S.C. § 119(e) of the priority of U.S. Provisional Application 62/004,375 filed on May 29, 2014, entitled "Power Control for Mitigating D2D Interference to Adjacent Networks," the entire disclosure of which is hereby incorporated by reference.

TECHNICAL FIELD

The present disclosure relates, in general, to wireless communications and, more particularly, to power control for mitigating device-to-device interference to adjacent networks.

BACKGROUND

Direct peer-to-peer device-to-device (D2D) communication can be exploited in cellular networks to improve overall network capacity as well as mitigate coverage holes for user equipment (UEs) that do not have network coverage.

D2D communication may involve bidirectional communication, where both devices receive and transmit in the same or different resources. D2D communication may also involve unidirectional communication, in which one of the devices transmits signals and the other device receives the signals. There may also exist a point-to-multipoint (e.g., multicast, broadcast, etc.) scenario in which a plurality of devices receive signals from the same transmitting device. The point-to-multipoint scenario is particularly useful for emergency services or public safety operation to spread vital information to several devices in an affected area. The term D2D communication and D2D operation are interchangeably used.

Typically, devices operate under the supervision of a radio access network with radio access nodes (e.g., a base station). In some scenarios, the devices themselves establish direct communication without the intervention of the network infrastructure.

In cellular network assisted D2D communications (or simply, network assisted D2D communications), UEs in the vicinity of each other can establish a direct radio link (D2D bearer). While UEs communicate over the D2D "direct" bearer, they also maintain a cellular connection with their respective serving base station (eNB). This direct link is interchangeably called a network (NW) link, D2D-NW link, or by other names equally descriptive. The NW link is used, for example, for resource assignment for D2D communication, maintenance of radio link quality of D2D communication link, or any other suitable parameter.

There are a variety of potential coverage scenarios for D2D communication. Examples of the various coverage scenarios are described in more detail below with respect to FIGS. 1A-C.

FIG. 1A is a schematic diagram of a partial-coverage scenario for D2D communication. More particularly, FIG. 1A illustrates UEs 110A and 110B and network node 115. In the partial-coverage scenario, at least one D2D UE communicating is under the network coverage, and at least one UE communicating is not under the network coverage. For example, in the scenario illustrated in FIG. 1A, UE 110B is under network coverage (i.e., within the coverage area of network node 115), and UE 110A is not under the network coverage. As described above, the D2D UE 110A not receiving network coverage can be due to lack of a network node in its vicinity, due to insufficient resources in any of the network nodes in its vicinity, or for other reasons. The partial-coverage scenario is also interchangeably called partial-network (PN) coverage.

FIG. 1B is a schematic diagram of the in-coverage scenario for D2D communication. More particularly, FIG. 1B illustrates UEs 110A and 110B and network node 115. In the in-coverage scenario, all D2D UEs communicating are under the network coverage. For example, in the scenario illustrated in FIG. 1B, both UE 110A and UE 110B are under network coverage (i.e., within the coverage area of network node 115). The D2D UEs 110A and 110B can receive signals from and/or transmit signals to at least one network node 115. In this case, the D2D UEs 110A and 110B can maintain a communication link with the network. The network in turn can ensure that the D2D communication does not cause unnecessary interference. The in-coverage scenario is also interchangeably called in-network (IN) coverage.

FIG. 1C is a schematic diagram of an out-of-coverage scenario for D2D communication. More particularly, FIG. 1C illustrates UEs 110A and 110B. In the out-of-coverage scenario, D2D UEs 110A and 110B communicating with each other are not under network node coverage. D2D UEs 110A and 110B cannot receive signals from and/or transmit signals to any of the network nodes. Typically, the lack of coverage is due to complete absence of network coverage in the vicinity of D2D UEs 110A and 110B. The lack of coverage, however, may also be due to insufficient resources in the network nodes to serve or manage D2D UEs 110A and 110B. Therefore, in this scenario the network cannot provide any assistance to the devices. The out-of-coverage scenario is also interchangeably called out-of-network (OON) coverage.

The emissions outside the bandwidth or frequency band of a UE are often termed as out-of-band (OOB) emissions or unwanted emissions. The major OOB and spurious emission requirements are typically specified by the standard bodies, and eventually enforced by the regulators in different countries and regions for both UEs and base stations. Examples of the OOB emissions include Adjacent Channel Leakage Ratio (ACLR) and Spectrum Emission Mask (SEM). Typically, the OOB emission requirements ensure that the emission levels outside the transmitter channel bandwidth or operating band remain several tens of dB below the transmitted signal.

Conservation of UE battery power can be facilitated when the UE has an efficient power amplifier (PA). The PA can be designed for certain operating points or configurations or set of parameter settings, such as, for example, modulation type, number of active physical channels (e.g., resource blocks in E-UTRA or number of CDMA channelization codes code and/or spreading factor in UTRA). To ensure that a UE fulfills OOB/spurious requirements for all allowed uplink (UL) transmission configurations, the UE is allowed to reduce its maximum UL transmission power in some scenarios. This is called maximum power reduction (MPR) or UE power back-off in some literature. For instance, a UE with maximum transmit power of 24 dBm power class may reduce its maximum power from 24 dBm to 23 or 22 dBm, depending upon the configuration.

In E-UTRA, an additional MPR (A-MPR) for the UE transmitter has also been specified in addition to the normal MPR. The A-MPR can vary between different cells, operating frequency bands and more specifically between cells deployed in different location areas or regions. In particular, the A-MPR may be applied by the UE in order to meet the additional emission requirements imposed by the regional regulatory organization. A-MPR is an optional feature, that is used by the network when needed depending upon the co-existence scenario. The A-MPR defines the UE maximum output power reduction (on top of the normal MPR) needed to fulfill certain emission requirements by accounting for factors such as: bandwidth, frequency band or resource block allocation. The A-MPR is therefore controlled by the network node by signaling to the UE a parameter called the network signaling (NS) parameter. For example, NS_01 and NS_02 correspond to different levels of pre-defined A-MPRs.

Even in the case of network-assisted D2D communication, the network may not fully manage the interference. Therefore there exists the potential for D2D communications to cause interference to both serving cellular networks as well as legacy co-located networks or co-existing networks in the same geographical region.

In LTE, potential D2D interference can be intra-frequency co-channel interference (i.e., collisions between transmitted resource blocks (RBs) within the system bandwidth), and/or interference from in-band emissions from the transmitting RBs within the system bandwidth into adjacent RBs to those RBs being employed for the desired transmission. Additionally, D2D communications can result in inter-device and intra-device interference across a number of channels in LTE including, for example, the Physical Uplink Control Channel (PUCCH) and Physical Uplink Shared Channel (PUSCH). The D2D communication typically takes place over LTE uplink channels, such as PUCCH/PUSCH or similar channels.

There also exists the potential for D2D communications to cause interference to both serving cellular networks as well as legacy networks, especially legacy networks that are co-located with the serving cellular networks. The interference may also be caused to the networks that co-exist in the same geographical areas where D2D UEs operate.

FIG. 2 is a schematic diagram of D2D transmission interference. More particularly, FIG. 2 illustrates UEs 110A-C and network nodes 115A and 115B. One or more of the UEs may be D2D capable. For example, UEs 110B and 110C may be D2D UEs. Transmission 205 from D2D UE 110B to D2D UE 110C may be a desired D2D transmission.

In FIG. 2, the D2D transmission 205 acts as an aggressor or interferer 215 to desired LTE transmissions on the UL for the D2D UE being out-of-network coverage and in-network or partial coverage. For example, transmission 210 from UE 110A to network node 115B may be interfered with by D2D communication 205. Note that these interference scenarios can only occur when the LTE network is operating in TDD duplex mode and the D2D transmission is not synchronized to the LTE network. For an FDD LTE network, since the D2D transmissions are on the UL, no co-channel interference will occur on the FDD DL channel. Interference to co-located co-existing networks, however, can occur.

The interfering situation becomes worse when D2D UEs are in partial-network coverage or even worse when they are completely out of network coverage. The following problems may occur: performance may be severely degraded; the D2D communication may not be sustained; and/or regulatory requirements on radio emissions may not be met by the D2D UEs.

SUMMARY

To address the foregoing problems with existing solutions, disclosed is a method in a network node. The method comprises determining a number of simultaneous device-to-device transmissions by a plurality of device-to-device capable wireless devices, comparing the determined number of simultaneous device-to-device transmissions to one or more threshold values, and determining a power control method from among a plurality of power control methods based at least in part on the comparison of the determined number of simultaneous device-to-device transmissions by the plurality of device-to-device capable wireless devices to the one or more threshold values.

In certain embodiments, the method may further comprise determining a transmit power level for the plurality of device-to-device capable wireless devices according to the determined power control method, the determined transmit power level being for use in subsequent device-to-device transmissions by the plurality of device-to-device capable wireless devices, and adjusting a transmit power of the plurality of device-to-device capable wireless devices. The method may further comprise communicating the determined power control method to the plurality of device-to-device capable wireless devices, the determined power control method being for use by the plurality of device-to-device capable wireless devices to adjust a transmit power of subsequent device-to-device transmissions. The method may further comprise configuring the plurality of wireless devices with a predefined identifier for each of the plurality of power control methods.

In certain embodiments, each of the plurality of power control methods may have at least one associated offset value comprising a defined reduction in a transmit power for the plurality of device-to-device capable wireless devices. In certain embodiments, the plurality of device-to-device capable wireless devices may be in a coverage area of the network node. In certain embodiments, at least one of the plurality of device-to-device capable wireless devices may be in a coverage area of a victim network node. In certain embodiments, none of the device-to-device capable wireless devices may be in a coverage area of the network node. The device-to-device transmissions may comprise D2D communication. The simultaneous device-to-device transmissions may comprise one or more of a number of transmissions that at least partially overlap in time, a number of transmissions that fully overlap in time, at least a threshold number of transmissions that at least partially overlap in time during a defined time period, and at least a threshold number of transmissions that fully overlap in time during a defined time period. The simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. The simultaneous device-to-device transmissions may comprise a weighted combination of two or more of simultaneous device-to-device discovery transmissions, simultaneous device-to-device broadcast transmissions, and cellular user equipment transmissions using a set of resources also being used by the plurality of device-to-device capable wireless devices.

In certain embodiments, the plurality of power control methods may comprise at least a first power control method and a second power control method, and determining the power control method from among the plurality of power control methods based at least in part on the comparison of the determined number of simultaneous device-to-device transmissions by the plurality of device-to-device capable wireless devices to the one or more threshold values may comprise selecting the first power control method if the number of simultaneous device-to-device transmissions by the plurality of device-to-device capable wireless devices is above a first threshold, and selecting the second power control method if the number of simultaneous device-to-device transmissions by the plurality of device-to-device capable wireless devices is below the first threshold. In certain embodiments, determining the power control method from among the plurality of power control methods based at least in part on the comparison of the determined number of simultaneous device-to-device transmissions by the plurality of device-to-device capable wireless devices to the one or more threshold values may comprise determining the power control method based at least in part on one or more of an interference rise over thermal as measured by a victim network node and a number of dropped calls as measured by the victim network node.

In certain embodiments, the determined number of simultaneous device-to-device transmissions may be compared to a first threshold, and the method may further comprise obtaining a value of interference rise over thermal as measured by a victim network node, and comparing the value of interference rise over thermal as measured by the victim network node to a second threshold. The determined number of simultaneous device-to-device transmissions may be compared to a first threshold, and the method may further comprise obtaining a number of dropped calls as measured by a victim network node, and comparing the number of dropped calls as measured by the victim network node to a third threshold. The determined number of simultaneous device-to-device transmissions may be compared to a first threshold, and the method may further comprise obtaining a value of interference rise over thermal as measured by a victim network node, comparing the value of interference rise over thermal as measured by the victim network node to a second threshold, obtaining a number of dropped calls as measured by the victim network node, and comparing the number of dropped calls as measured by the victim network node to a third threshold.

Also disclosed is a network node. The network node comprises one or more processors. The one or more processors are configured to determine a number of simultaneous device-to-device transmissions by a plurality of device-to-device capable wireless devices, compare the determined number of simultaneous device-to-device transmissions to one or more threshold values, and determine a power control method from among a plurality of power control methods based at least in part on the comparison of the determined number of simultaneous device-to-device transmissions by the plurality of device-to-device capable wireless devices to the one or more threshold values.

Also disclosed is a method in a wireless device. The method comprises obtaining information about a number of simultaneous device-to-device transmissions by a plurality of device-to-device capable wireless devices, comparing the number of simultaneous device-to-device transmissions to one or more threshold values, and determining a power control method from among a plurality of power control methods based at least in part on the comparison of the number of simultaneous device-to-device transmissions by the plurality of device-to-device capable wireless devices to the one or more threshold values. The method further comprises determining a transmit power level for the wireless device according to the determined power control method, and performing a device-to-device transmission on a device-to-device link using the determined transmit power level.

In certain embodiments, the device-to-device transmissions may comprise D2D communication. The simultaneous device-to-device transmissions may comprise one or more of a number of transmissions that at least partially overlap in time, a number of transmissions that fully overlap in time, at least a threshold number of transmissions that at least partially overlap in time during a defined time period, and at least a threshold number of transmissions that fully overlap in time during a defined time period. The simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. The simultaneous device-to-device transmissions may comprise a weighted combination of two or more of simultaneous device-to-device discovery transmissions, simultaneous device-to-device broadcast transmissions, and cellular user equipment transmissions using a set of resources also being used by the plurality of device-to-device capable wireless devices.

In certain embodiments, the plurality of power control methods may comprise at least a first power control method and a second power control method. Determining the power control method from among the plurality of power control methods based at least in part on the comparison of the number of simultaneous device-to-device transmissions by the plurality of device-to-device capable wireless devices to the one or more threshold values may comprise selecting the first power control method if the number of simultaneous device-to-device transmissions by the plurality of device-to-device capable wireless devices is above a first threshold, and selecting the second power control method if the number of simultaneous device-to-device transmissions by the plurality of device-to-device capable wireless devices is below the first threshold. Determining the power control method from among the plurality of power control methods based at least in part on the comparison of the determined number of simultaneous device-to-device transmissions by the plurality of device-to-device capable wireless devices to the one or more threshold values may comprise determining the power control method based at least in part on one or more of an interference rise over thermal as measured by a victim network node and a number of dropped calls as measured by the victim network node. In certain embodiments, the wireless device may be configured with a predefined identifier for each of the plurality of power control methods. Each of the plurality of power control methods may have at least one associated offset value comprising a defined reduction in a transmit power for the wireless device.

In certain embodiments, the number of simultaneous device-to-device transmissions may be compared to a first threshold, and the method may further comprise obtaining a value of interference rise over thermal as measured by a victim network node, and comparing the value of interference rise over thermal as measured by the victim network node to a second threshold. The number of simultaneous device-to-device transmissions may be compared to a first threshold, and the method may further comprise obtaining a number of dropped calls as measured by a victim network node, and comparing the number of dropped calls as measured by the victim network node to a third threshold. The number of simultaneous device-to-device transmissions may be compared to a first threshold, and the method may further comprise obtaining a value of interference rise over thermal as measured by a victim network node, comparing the value of interference rise over thermal as measured by the victim network node to a second threshold, obtaining a number of dropped calls as measured by the victim network node, and comparing the number of dropped calls as measured by the victim network node to a third threshold.

In certain embodiments, the method may further comprise transmitting at a full power if the number of simultaneous device-to-device transmissions is below the first threshold and one or both of the interference rise over thermal as measured by the victim network node is below the second threshold and the number of dropped calls as measured by the victim network node is below the third threshold.

In certain embodiments, the plurality of device-to-device capable wireless devices may be in a coverage area of a serving network node. In certain embodiments, at least one of the plurality of device-to-device capable wireless devices may be in a coverage area of a victim network node. In certain embodiments, none of the device-to-device capable wireless devices involved in D2D operation may be in a coverage area of the network node.

Also disclosed is a wireless device. The wireless device comprises one or more processors. The one or more processors are configured to obtain information about a number of simultaneous device-to-device transmissions by a plurality of device-to-device capable wireless devices, compare the number of simultaneous device-to-device transmissions to one or more threshold values, and determine a power control method from among a plurality of power control methods based at least in part on the comparison of the number of simultaneous device-to-device transmissions by the plurality of device-to-device capable wireless devices to the one or more threshold values. The one or more processors are configured to determine a transmit power level for the wireless device according to the determined power control method, and perform a device-to-device transmission on a device-to-device link using the determined transmit power level.

Also disclosed is a method in a first wireless device. The method comprises determining a number of simultaneously transmitting device-to-device capable wireless devices of a plurality of device-to-device capable wireless devices, the plurality of device-to-device capable wireless devices outside a coverage area associated with a serving cell, the first wireless device serving the plurality of device-to-device capable wireless devices, comparing the determined number of simultaneously transmitting device-to-device capable wireless devices to one or more threshold values, and determining a power control method from among a plurality of power control methods based at least in part on the comparison of the determined number of simultaneously transmitting device-to-device capable wireless devices to the one or more threshold values.

In certain embodiments, the method may further comprise determining a transmit power level for the plurality of device-to-device capable wireless devices according to the determined power control method, the determined transmit power level being for use in subsequent device-to-device transmissions by the plurality of device-to-device capable wireless devices, and adjusting a transmit power of the plurality of device-to-device capable wireless devices. In certain embodiments, the method may further comprise communicating the determined power control method to the plurality of device-to-device capable wireless devices, the determined power control method being for use by the plurality of device-to-device capable wireless devices to adjust a transmit power of subsequent device-to-device transmissions.

In certain embodiments, the number of simultaneously transmitting device-to-device capable wireless devices may comprise one or more of a number of device-to-device capable wireless devices that are transmitting and served by the first wireless device, a number of device-to-device capable wireless devices that are transmitting and are one or more hops from the first wireless device, and a total of all device-to-device capable wireless devices from an aggressor network that are transmitting. The simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. The simultaneous device-to-device transmissions may comprise a weighted combination of two or more of the simultaneous device-to-device discovery transmissions, the simultaneous device-to-device broadcast transmissions, and the cellular user equipment transmissions using a set of resources also being used by the plurality of device-to-device capable wireless devices.

In certain embodiments, the plurality of power control methods may comprise at least a first power control method and a second power control method, and determining the power control method from among a plurality of power control methods based at least in part on the comparison of the number of simultaneously transmitting device-to-device capable wireless devices to the one or more threshold values may comprise selecting the first power control method if the number of simultaneously transmitting device-to-device capable wireless devices is above a first threshold, and selecting the second power control method if the number of simultaneously transmitting device-to-device capable wireless devices is below the first threshold. Determining the power control method from among a plurality of power control methods based at least in part on the comparison of the determined number of simultaneously transmitting device-to-device capable wireless devices to the one or more threshold values may comprise determining the power control method based at least in part on one or more of an interference rise over thermal as measured by a victim network node and a number of dropped calls as measured by the victim network node. Each of the plurality of power control methods may have at least one associated offset value comprising a defined reduction in a transmit power for the plurality of device-to-device capable wireless devices.

In certain embodiments, the determined number of simultaneously transmitting device-to-device capable wireless devices may be compared to a first threshold, and the method may further comprise obtaining information about the interference rise over thermal as measured by the victim network node, and comparing the value of interference rise over thermal as measured by the victim network node to a second threshold. The determined number of simultaneously transmitting device-to-device capable wireless devices may be compared to a first threshold, and the method may further comprise obtaining the number of dropped calls as measured by the victim network node, and comparing the number of dropped calls as measured by the victim network node to a second threshold. The determined number of simultaneously transmitting device-to-device capable wireless devices may be compared to a first threshold, and the method may further comprise obtaining the value of interference rise over thermal as measured by the victim network node, comparing the value of interference rise over thermal as measured by the victim network node to a second threshold, obtaining the number of dropped calls as measured by the victim network node, and comparing the number of dropped calls as measured by the victim network node to a third threshold.

Also disclosed is a wireless device. The wireless device comprises one or more processors. The one or more processors are configured to determine a number of simultaneously transmitting device-to-device capable wireless devices of a plurality of device-to-device capable wireless devices, the plurality of device-to-device capable wireless devices outside a coverage area associated with a serving cell, the first wireless device serving the plurality of device-to-device capable wireless devices, and compare the determined number of simultaneously transmitting device-to-device capable wireless devices to one or more threshold values. The one or more processors are configured to determine a power control method from among a plurality of power control methods based at least in part on the comparison of the determined number of simultaneously transmitting device-to-device capable wireless devices to the one or more threshold values.

Certain embodiments of the present disclosure may provide one or more technical advantages. For example, certain embodiments may enable a D2D UE to adapt its transmit power on D2D link so as to avoid interference at a victim network node. As another example, certain embodiments may enable a serving network node to maintain a larger number of active D2D UEs with their D2D transmissions without impacting or degrading the reception performance at the victim network nodes. As yet another example, certain embodiments may enable D2D operation in partial-network coverage and out-of-network coverage operation without degrading the reception performance at the victim network nodes by indirectly controlling the D2D UEs' transmission power as a function of D2D transmissions. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, D2D communications may cause interference to both serving cellular networks as well as legacy co-located networks or co-existing networks in the same geographical region. There is also the potential for inter-device and intra-device interference across a number of channels. This can result in a number of problems in the network. For example, performance may be severely degraded, D2D communication may not be sustained, and/or regulatory requirements on radio emissions may not be met by the D2D UEs.

The present disclosure contemplates various embodiments for adjusting the transmit power of a D2D UE that may address these and other issues relating to interference resulting from D2D communications. For example, in certain embodiments, an in-network scenario is described in which a serving network node adjusts a power level of at least one of a plurality of D2D UE's in the serving network. The power adjustment may be based on any suitable criteria. For example, the power adjustment may be based on at least a number of simultaneous D2D transmissions in an aggressor network, and in addition may be based on one or more measurement reports from a victim network node (such as, for example, one or more of received interference power levels over thermal noise, dropped call statistics of the victim network node, aggregate throughput loss in victim network and SINR below a given threshold).

As another example, in certain embodiments a method is disclosed for power controlling D2D UEs in a partial-coverage scenario with respect to a serving aggressor network, such that D2D interference in adjacent networks is mitigated. As yet another example, in certain embodiments a method is disclosed for power controlling the D2D transmissions based on the number of simultaneous D2D transmissions for an out-of-coverage scenario. The device-to-device transmissions may comprise D2D communication.

As still another example, in certain embodiments, a method in a D2D UE served by a first network node is disclosed. The D2D UE may obtain information about a number (N) of D2D UEs involved in D2D transmissions in a cell served by the first network node. The D2D UE may compare the obtained value of N with one or more thresholds, and determine one of a plurality of power control methods based on the comparison. The D2D UE may determine a transmit power level based on the determined power control method, and perform D2D transmission on a D2D link with the determined transmit power level. These various embodiments are described in more detail below.

Figure 1B:
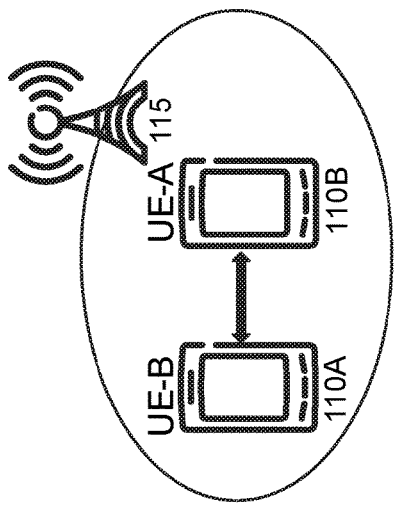
FIG. 1B is a schematic diagram of an in-coverage scenario for D2D communication.
Figure 1C:
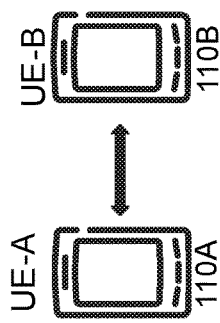
FIG. 1C is a schematic diagram of an out-of-coverage scenario for D2D communication.
Figure 1A:
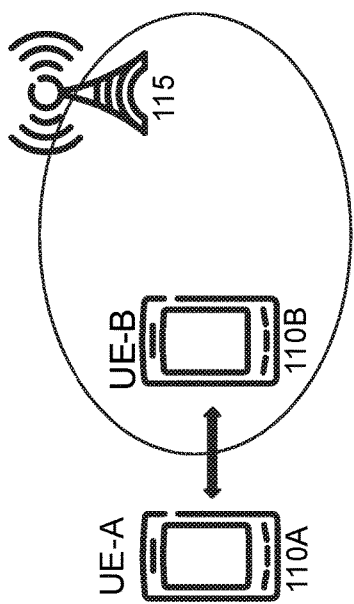
FIG. 1A is a schematic diagram of a partial-coverage scenario for D2D communication.
Figure 2:
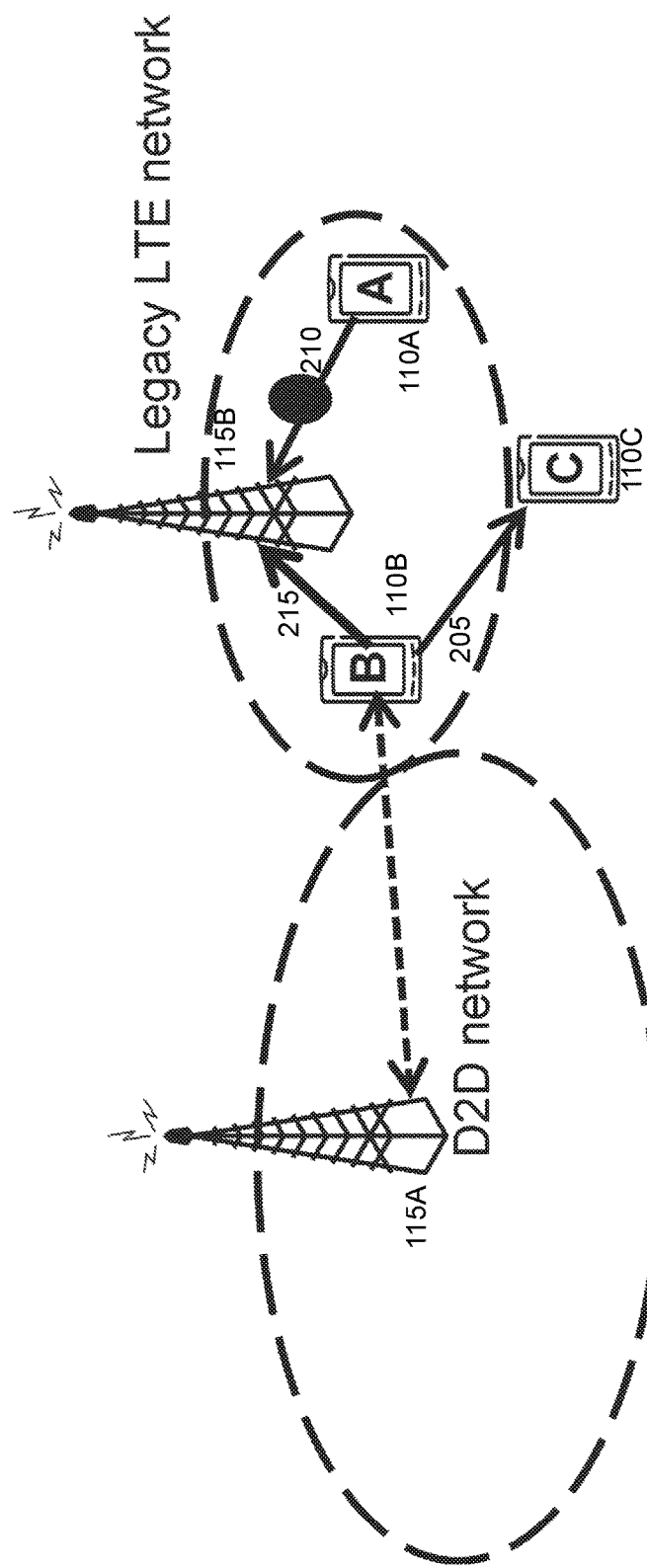
FIG. 2 is a schematic diagram of D2D transmission interference.
Figure 3:
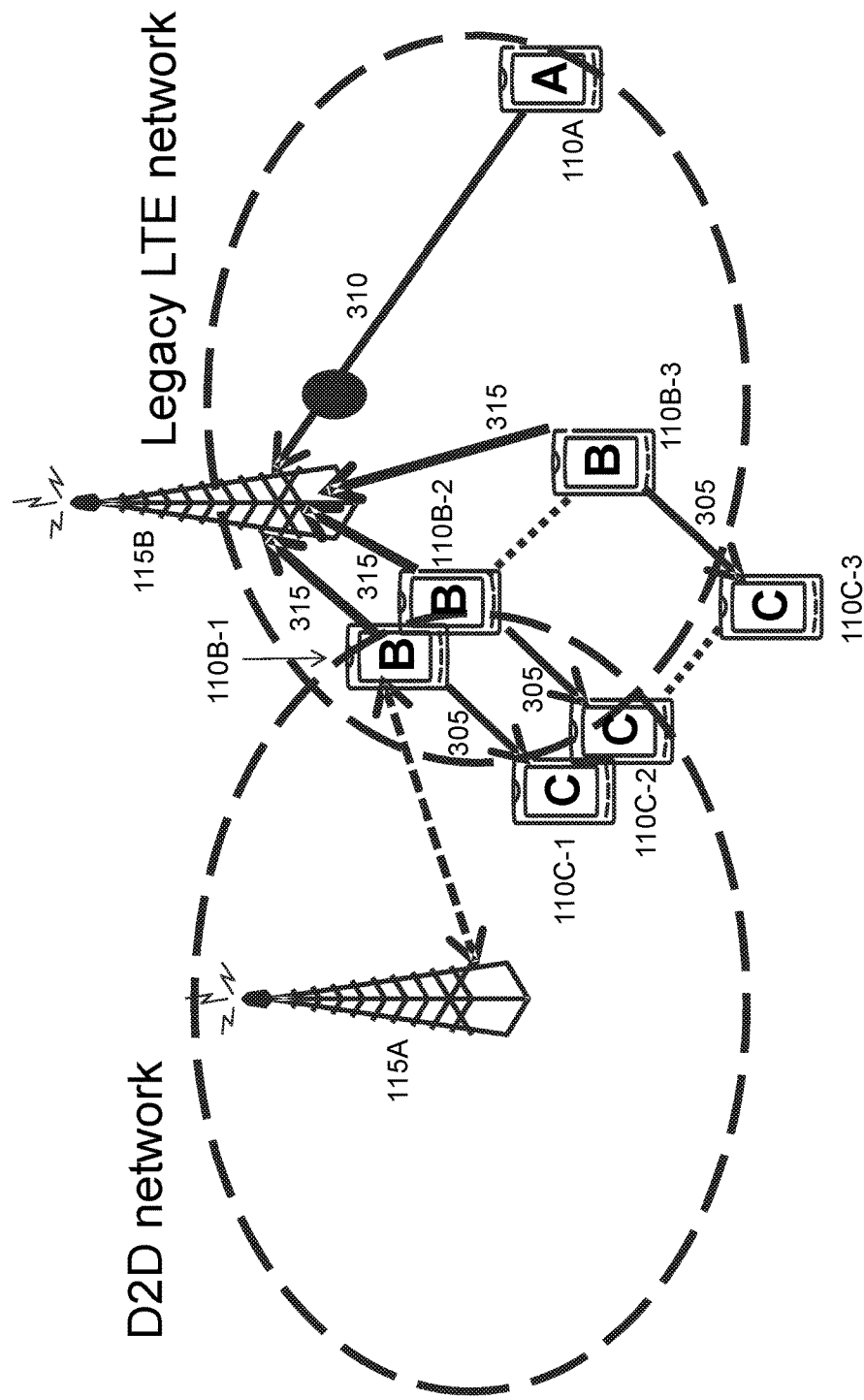
FIG. 3 illustrates serving network assisted D2D power control based on a number of D2D transmitters for an in-network coverage scenario, in accordance with certain embodiments.

FIG. 3 illustrates serving network assisted D2D power control based on a number of D2D transmitters for an in-coverage scenario, in accordance with certain embodiments. More particularly, FIG. 3 illustrates a network including a plurality of wireless devices 110A, 110B-1, 110B-2, 110B-3, 110C-1, 110C-2 and 110C-3 (which may be interchangeably referred to as UEs), and network nodes 115A and 115B (which may be interchangeably referred to as eNBs 115). A wireless device 110 may communicate with a network node 115 over a wireless interface. For example, wireless device 110B-1 may transmit wireless signals to network node 115A and/or receive wireless signals from radio network node 115A. As another example, wireless device 110A may transmit wireless signals to network node 115B and/or receive wireless signals from network node 115A. The wireless signals may contain voice traffic, data traffic, control signals, and/or any other suitable information. In some embodiments, an area of wireless signal coverage associated with a radio network node 115 may be referred to as a cell. Wireless devices 110 may be D2D capable wireless devices. D2D UEs, such as D2D UEs 110B-1, 110B-2, and 110B-3 may communicate using D2D communication with one or more other wireless devices, such as, for example, D2D UEs 110C-1, 110C-2, and 110C-3, respectively.

Network nodes 115 may interface with a radio network controller. The radio network controller may control network node 115 and may provide certain radio resource management functions, mobility management functions, and/or other suitable functions. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any other suitable communication link, including combinations thereof. In some radio access technologies (RATs) such as in LTE networks, the functions of the radio network controller may be comprised in the network nodes 115.

In some embodiments, the core network node may manage the establishment of communication sessions and various other functionality for wireless devices 110. For example, wireless devices 110A-C, radio network nodes 115A-C, and packet core network node 130 may use any suitable radio access technology, such as long term evolution (LTE); LTE-Advanced; Universal Mode Telecommunications System (UMTS); High Speed Packet Access (HSPA); Global System for Mobile Communications (GSM); code division multiple access 2000 (CDMA2000); Worldwide Interoperability for Microwave Access (WiMax); WiFi; another suitable radio access technology; or any suitable combination of one or more of these or other radio access technologies. Wireless devices 110 may exchange certain signals with the core network node using the non-access stratum layer. In non-access stratum signaling, signals between wireless devices 110 and core network node 130 may be transparently passed through the radio access network. Example embodiments of wireless devices 110, network nodes 115, and other network nodes (such as a radio network controller or core network node) are described with respect to FIGS. 9, 10, and 11, respectively.

As described above, one or more of wireless devices 110 may be capable of D2D communication. For example, D2D UEs 110B-1, 110B-2, and 110B-3 may communicate desired D2D transmissions 305 to D2D UEs 110C-1, 110C-2, and 110C-3. D2D transmissions 305 may act as aggressors or interferers 315 to desired LTE transmissions on the UL. For example, a desired LTE transmission 310 from UE 110A to network node 115B may be interfered with by D2D communications 305.

Operation of UEs 110 related to D2D communication involves transmission and/or reception of radio signals, which are associated with one or more radio parameters. Examples of radio parameters include receiver sensitivity, transmission power, transport format, maximum power reduction (MPR), additional MPR (A-MPR), or any other suitable radio parameters.

D2D UEs 110 may operate in any suitable coverage type. For example, D2D UEs 110 may operate in in-network coverage, out-of-network coverage, and partial-network coverage. In existing solutions, D2D UEs 110 use the same values of radio parameters regardless of the type of coverage in which D2D UEs 110 operate. In certain embodiments described herein, at least one radio parameter may be specific to the coverage type in which D2D UE 110 operates. The remaining parameters may not necessarily depend upon the coverage, and are therefore not coverage specific. Coverage or network coverage specific radio parameters (also known as coverage related parameters) used by one or more D2D UEs 110 depend upon the type of coverage in which a D2D UE 110 is operating or performing D2D communication.

Coverage specific radio parameters may be determined in any suitable manner. For example, coverage specific radio parameters may be pre-defined, configured by one or more network nodes 115 at D2D UE 110, or broadcasted by one or more network node 115. For example, in certain embodiments, different values of the same parameter may be pre-defined to be used by the D2D UE for different coverage scenarios (e.g., in-network, out-of-network and partial-network coverage). The coverage specific radio parameters can be related to radio transmission (i.e., radio transmission parameters) and/or radio reception (i.e., radio reception parameters).

Radio parameters that may be coverage specific radio transmission or transmitter parameters (also known as RF transmitter parameters) may be any suitable radio parameters. For example, coverage specific radio parameters that can be coverage specific radio transmission or transmitter parameters may include UE transmit power, UE maximum output power, UE minimum output power, UE OFF power (i.e., UE power after transmitter is OFF), UE maximum power reduction (MPR), additional MPR (A-MPR), ON/OFF time mask of uplink signals (e.g., PRACH, SRS, PUCCH, PUSCH etc.), transmit power tolerance or accuracy (e.g., absolute or relative power tolerance such as +/1 dB), transmit signal quality (e.g., error vector magnitude (EVM), NS value controlling A-MPR, frequency error, carrier leakage (i.e., leakage of signal within bandwidth), in-band emissions, out of band emission, spectrum emission mask, additional spectrum emission mask, Adjacent Channel Leakage Ratio (ACLR), spurious emissions, additional spurious emissions, transmit intermodulation, time alignment error between signals from different carriers and/or different transmit antennas, transmission bandwidth, transport format (e.g., MCS, number of transport block, size of transport block etc), step size of power control, or any other suitable radio parameter.

Radio parameters that may be coverage specific radio reception or receiver parameters (also known as RF receiver parameters) may be any suitable radio parameters. For example, radio parameters that can be coverage specific radio reception or receiver parameters may include reference sensitivity power level (also known as REFSENS), maximum input level, adjacent Channel Selectivity (ACS), blocking characteristics (e.g., in-band blocking, out-of-band blocking, narrow band blocking, spurious response, receiver intermodulation (e.g., wide band intermodulation), spurious emissions, receiver image, reception bandwidth, and/or any other suitable radio parameter.

Other parameters may be exchanged between networks. For example, the parameters exchanged between networks may include positioning information of the victim network nodes relative to the positions of the aggressor network nodes, as well as channel fingerprinting or propagation information of the victim network relative to the aggressor network.

In certain embodiments, coverage specific radio parameters may also be specific to or linked to frequency bands and/or channel bandwidth. For example, different parameter values may be defined for different bands and/or BW.

As described above, FIG. 3 illustrates serving network assisted D2D power control based on a number of D2D transmitters for an in-network coverage scenario. In the scenario illustrated in FIG. 3, a cluster of aggressor network D2D UE's 110B-1, 110B-2, and 110B-3 are transmitting to D2D UE's 110C-1, 110C-2, and 110C-3. The transmissions 305 from D2D UE's 110B-1, 110B-2, and 110B-3 may cause interference on the UL to a legacy LTE victim network node 115B. Certain embodiments described herein may allow serving aggressor D2D network node 115A to define the power control of the D2D transmitting UE's 110B-1, 110B-2, and 110B-3 based on the number of simultaneous D2D transmissions in the aggressor network cell, or cluster of aggressor network cells, for which the D2D transmissions of the UEs in the aggressor network may cause interference to victim network node 115B. Victim network node(s) 115B may be serving only legacy LTE UEs (such as UE 110A), D2D UEs, or a combination thereof. The aggressor network node 115A and victim network node 115B may or may not be co-located at the same site or geographical location.

In certain embodiments, a method is disclosed for serving network assisted power control of serving network D2D transmissions based on the number of simultaneous D2D transmissions in an aggressor network cell, or cluster of aggressor network cells. The D2D transmissions of one or more UEs in the aggressor network may cause interference to co-located victim network legacy LTE UEs, such as UE 110A. For example, network node 115A (e.g., a serving node) may be managing D2D communication between D2D UEs in the serving network. Network node 115A may determine a number (N) of simultaneous device-to-device transmissions by a plurality of D2D UEs involved in D2D transmissions in the cell served by network node 115A. Network node 115A may compare the determined number of simultaneous D2D transmissions to one or more thresholds values. Network node 115A may determine a power control method from among a plurality of power control methods based at least in part on the comparison of the determined number of simultaneous D2D transmissions to one or more threshold values. The D2D transmissions may comprise D2D communication. Network node 115A may determine a transmit power level of a D2D UE, such as D2D UE 110B-1, for D2D transmission according to the determined power control method.

The number of simultaneous transmissions (N) can be defined over a cluster of D2D UEs or a geographical region over which the number of simultaneously transmitting D2D UEs is defined. A geographical region or cluster of D2D UEs can comprise one or more cells served by one or more aggressor network nodes, victim network nodes, or a D2D UE acting as a serving node for out-of-coverage scenarios. The simultaneous transmissions (N) from two or more D2D UEs may take place over partially or fully overlapping time.

To illustrate, consider the following example. Assume two D2D UEs transmit signals in one or more subframes (also known as transmission occasions) once every 40 ms over time period T0 (e.g., T0=4 seconds). In one example, transmissions from the two D2D UEs over T0 may be considered to be simultaneous when at least one transmission occasion from both D2D UEs at least partly overlaps in time. In another example, the transmissions from the two D2D UEs over T0 may be considered to be simultaneous when at least one transmission occasion from both D2D UEs fully overlaps in time. In yet another example, the transmissions from the two D2D UEs over T0 may be considered to be simultaneous when at least a certain number of transmission occasions over T0 from both D2D UEs at least partly overlap in time. In still another example, the transmissions from the two D2D UEs over T0 may be considered to be simultaneous when at least a certain number of transmission occasions from both D2D UEs fully overlap in time.

The threshold (Nthres) may be expressed in terms of simultaneous number of D2D UEs or D2D transmissions (i.e., transmission by D2D UE on D2D link) in a cell beyond which the interference caused by the D2D transmissions on one or more victim network nodes remains within an acceptable limit. The value of the one or more thresholds can be different for different types of D2D transmissions (e.g., different values for D2D communication, D2D discovery, etc). For example, if the total number of simultaneous D2D transmissions related to D2D discovery signals is below 32, then interference at the victim node(s) 115B is considered to be within an acceptable limit.

Network node 115A may adjust the transmit power used for D2D operation of at least one of the D2D UEs, such D2D UE 110B-1. The adjustment may be based on the determined transmit power. In certain embodiments, the adjustment may be performed by configuring the D2D UEs with the said transmit power level.

In some instances, determining the transmit power level may be based on at least one measurement report from at least one of victim network node 115B, wherein the measurement report may be indicative of at least the signal quality or interference seen at victim network node 115B due to the D2D UEs' transmissions in an aggressor cell managed by network node 115A. As one example, the one or more measurement reports from the victim network may include a number of transmitting D2D UEs and received interference at one or more victim network node 115B (e.g., interference rise over thermal (IoT) experienced at one or more network nodes of the victim network). As another example, the one or more measurement reports from the victim network may include a number of dropped calls in one or more cells served by the network nodes in the victim network. As another example, the one or more measurement reports from the victim network may include received power levels at one or more victim network nodes in victim network. As yet another example, the one or more measurement reports from the victim network may include inband emissions of the D2D UEs operating in the aggressor network.

In other embodiments, methods for which the D2D UE's are in partial coverage with respect to the serving aggressor network. In other embodiments, methods for which the D2D transmissions are power controlled based on the number of simultaneous D2D transmissions for the OOC scenario.

In certain embodiments, serving network node 115A may determine the number of simultaneous transmissions (N) from D2D UEs (e.g., D2D UEs 110B-1, 110B-2, 110B-3, 110C-1, 110C-2, and 110C-3) and signal this information to the D2D UEs. By using this information, and according to one or more pre-defined rules, the D2D UEs 110B-1, 110B-2, 110B-3, 110C-1, 110C-2, and 110C-3 may adapt their power control scheme. This method can be used when a D2D UE is in coverage of network node 115A. For example, a pre-defined rule may require a D2D UE to adjust its power when transmitting on a D2D link according to a power control method.

The power control method may be determined in any suitable manner. In certain embodiments, the power control method may be determined based on one or more thresholds. The one or more thresholds may be based on any suitable criteria, such as the number of simultaneous transmissions (N) from D2D UEs described above. For example, a D2D UE may adjust its power according to a first power control method if N is below a threshold, and a second power control method otherwise (i.e., if N is above a threshold).

In certain embodiments, the first and second power control methods may be pre-defined. The value of the threshold can be pre-defined or signalled by the network node to the UE 110. The power control methods and the thresholds can be the same or different for different types of D2D operational mechanisms (such as, for example, D2D communication without feedback, D2D communication with feedback, D2D UE, D2D discovery signal transmission, or any other suitable D2D operational mechanism). In D2D communication without feedback, the receiving D2D UE does not send any feedback signal (e.g., HARQ feedback, etc.) to the transmitting D2D UE. In D2D communication with feedback, the receiving D2D UE can send any feedback signal (e.g., HARQ feedback, etc.) to the transmitting D2D UE; in this case closed loop power control can be used.

The D2D UE may, based on one or more pre-defined rules, autonomously adjust its transmit power on the D2D link. For example, the D2D UE, such as D2D UE 110B-1, may obtain the value of N from a network node. D2D UE 110B-1 may compare the obtained value of N with a threshold, and determine a power control method to be used for transmissions on D2D link. D2D UE 110B-1 transmits signals on the D2D link by controlling or adjusting its transmit power according to the determined power control method.

There may be more than two power control methods. For example, there may be three power control methods and two thresholds in terms of number of simultaneous transmissions. In this case as well, D2D UE 110B-1 may select and use the power control method based on a comparison between the value of N and two or more thresholds. Furthermore, the power control method selected may be based on any suitable criteria. For example, the power control method selected may be based on a combination of the number of simultaneous D2D transmitters N, and measurements from the victim network on the level of degradation that it is experiencing. The measurements from the victim network may be any suitable measurements. As described above, the measurements from the legacy victim network may include an increase in interference above the noise floor as seen by one or more victim network nodes 115B, and/or the number of dropped calls per unit time as experienced by one or more victim network nodes 115B. Yet another measurement (third measurement) can be the amount of reduction in received bit rate and/or throughput compared to a reference value. The reference value may be any suitable value. For example, the reference value may be the maximum possible achievable bit rate or throughput or a percentage (X%) of the maximum possible achievable bit rate or throughput (e.g., X% can be 90%).

As described above, FIG. 3 illustrates power control of D2D UEs 110B-1, 110B-2, and 110B-3 transmissions based on the number of transmitting D2D UEs. As shown in FIG. 3, the D2D transmissions are in-coverage of the serving aggressor D2D network. In such a case, the serving aggressor network may have knowledge of the number of D2D users (N) that are simultaneously transmitting. In certain embodiments, network node 115A may compare the value of N with at least one threshold, and determine one of the at least two possible power control methods to be used by the D2D UEs 110B-1, 110B-2, and 110B-3 to adjust their power for transmitting radio signals on the D2D link. As such, the serving aggressor network node 115A of D2D UEs 110B-1, 110B-2, and 110B-3 can signal the power control level to transmitting D2D devices 110B-1, 110B-2, and 110B-3. In some embodiments, serving network node 115A may also configure the D2D UEs 110B-1, 110B-2, and 110B-3 with a pre-defined identifier of the determined power control method. In such a case, D2D UEs 110B-1, 110B-2, and 110B-3, based on the pre-defined power control method and the obtained identifier, may autonomously determine a transmit power level and transmit signals on the D2D link according to the determined transmit power level.

The determined power control method may be any suitable power control method. Some examples of possible power control methods are described in more detail below.

For example, according to a first in-coverage power control method, the D2D transmit power of a D2D UE, such as D2D UE 110B-1, is dictated by the number of D2D UEs that are simultaneously transmitting, such that the D2D UE transmit power is given by:

$$P_{D2D} \leq P_0 - N \times D2D_{offset(i)} \quad (1)$$

in which $P_{D2D}$ is the power controlled transmit power of D2D UE 110B-1, $P_0$ is the nominal maximum transmit power of D2D UE 110B-1, N is the number of simultaneous D2D transmissions and $D2D_{offset(i)}$ is a defined reduction in the transmit power based on the power control method "I". The power control method can be determined through an association of a given scenario with a value of "N" that defines the value of $D2D_{offset(i)}$. For example, N could be the number of simultaneous D2D discovery transmissions $N_{discovery}$, or the number of simultaneous D2D broadcast transmissions $N_{broadcast}$ or a combination of the number of simultaneous D2D discovery and D2D broadcast transmissions. Note that the combination of the number of simultaneous D2D discovery and D2D broadcast transmissions can be a linear addition of the two values $N_{discovery}$ and $N_{broadcast}$ or a weighted combination of the two values.

If a weighted combination of the two values is used, the weighted combination may be determined in any suitable manner. As one example, the expression for a weighted combination of the two values ($N_{discovery}$ and $N_{broadcast}$) may be as shown below:

$$N = \alpha * N_{discovery} + \beta * N_{broadcast} \quad (2)$$

where $\alpha$ and $\beta$ can be integers or floating point values. As special cases: $\alpha=0$ and $\beta \geq 0$ or $\alpha \geq 0$ and $\beta=0$.

In some cases, a cellular UE (i.e., a UE having only radio link(s) with the network node, such as UE 110A) and D2D UEs may share the same resources in time. In such a case, the value of N can also be a weighted combination of three values: $N_{discovery}$, $N_{broadcast}$ and $N_{cellular}$. In some cases, a cellular UE can also be a D2D UE which simultaneously transmits on D2D link and also on the link towards the network node over the same radio resource. For example, the cellular UEs, D2D UEs (UEs involved in discovery and/or communication) can transmit during the same time resource (e.g., time slot, subframe, symbols, etc.). An example of such an expression for a weighted combination of the three values ($N_{discovery}$, $N_{broadcast}$ and $N_{cellular}$) is shown below:

$$N=\alpha*N_{discovery}+\beta*N_{broadcast}+\mu*N_{cellular} \quad (3)$$

where $\alpha$, $\beta$ and $\mu$ can be integers or floating point values. As special cases: any one or two of the values of $\alpha$, $\beta$ and $\mu$ can be set to zero, while the others can be non-zero.

As an illustration, Table 1 below provides examples of possible mapping of the values of N to a given $D2D_{offset(i)}$. In some cases, the first power control method may be selected by default if no measurement information is available from the victim legacy network with regard to the increase in interference due to the simultaneous D2D transmissions.

TABLE 1

Examples of Mappings between N and D2D power control offsets

| $N_{discovery}$ | $N_{broadcast}$ | $N_{total}$ | Power Control Method | $D2D_{offset(i)}$ |
|---|---|---|---|---|
| 0 | $>N_{b1}$ | $>N_{b1}$ | 1 | $D2D_{offset(1)}$ |
| $>N_{d1}$ | $>N_{b1}$ | $>N_{b1}+N_{b1}$ | 1 | $D2D_{offset(2)}$ |
| 0 | $>N_{b2}$ | $>N_{b2}$ | 1 | $D2D_{offset(3)}$ |
| $>N_{d1}$ | $>N_{b2}$ | $>N_{d1}+N_{b1}$ | 1 | $D2D_{offset(4)}$ |
| $>N_{d2}$ | $>N_{b2}$ | $>N_{d2}+N_{b2}$ | 1 | $D2D_{offset(5)}$ |
| $>N_{d1}$ | 0 | $>N_{d1}$ | 1 | $D2D_{offset(6)}$ |
| $>N_{d2}$ | 0 | $>N_{d2}$ | 1 | $D2D_{offset(7)}$ |
| $<N_{d1}$ | 0 | $<N_{d1}$ | 4 | 0 |
| 0 | $<N_{b1}$ | $<N_{b1}$ | 4 | 0 |

Typical values of D2D offsets can be in the range [0] dB to [5] dB range.

As another example, according to a second in-coverage power control method, the D2D transmit power may be dictated by a combination of the number of D2D UE's that are simultaneously transmitting in the aggressor network cell, as well as the IoT as measured by the victim network. The victim network can signal this IoT value to the aggressor network in any suitable manner. For example, the victim network can signal the IoT value directly between aggressor network node 115A and victim network node 115B using an X2 interface (or any other suitable internode interface), or indirectly through the respective networks of aggressor network node 115A and victim network node 115B. In this case the D2D UE transmit power is given by $$P_{D2D} \le P_0 - N \times D2D_{offset(i)} \times \beta \times IoT \quad (4)$$

in which $\beta0$ is a network controlled parameter between 0 and 1. Similar to the first in-coverage power control method described above, the value of $D2D_{offset(i)}$ can be associated with a range of N, for an IoT measurement above a threshold1 (similar to the $D2D_{offset(i)}$ values defined in Table 1 above, but optimized for the range of measured IoT). For example, if the value of $D2D_{offset(i)}$ is below threshold1, the power control method may default to the first in-coverage power control method. An another example, if the value of IoT is above a second threshold2, a second set of $D2D_{offset(i)}$ values will be associated with the value of N, (similar to Table 1 above, but optimized to a different set of $D2D_{offset(i)}$ values specific to the value of IoT above threshold2).

As yet another example, according to a third in-coverage power control method, the D2D transmit power may be dictated by a combination of the number of D2D UE's that are simultaneously transmitting in the aggressor network cell, as well as the number of dropped calls ndrop as measured by the victim network nodes, such as victim network node 115B, over a defined interval. The victim network can signal the ndrop value to the aggressor network in any suitable manner. For example, the victim network may signal the ndrop value to the aggressor network directly between aggressor network node 115A and victim network node 115B using an X2 interface, or indirectly through the respective networks of aggressor network node 115A and victim network node 115B. In this case the D2D UE transmit power is given by $$P_{D2D} \le P_0 - N \times D2D_{offset(i)} \times \beta \times ndrop \quad (5)$$

in which $\beta$ is a network controlled parameter between 0 and 1.

Similar to the first in-coverage power control method described above, the value of $D2D_{offset(i)}$ can be associated with a range of N, for an ndrop measurement above a threshold1 (similar to the $D2D_{offset(i)}$ values defined in Table 1 above, but optimized for the range of measured ndrop). For example, if the value of $D2D_{offset(i)}$ is below threshold1, the power control method will default to the first in-coverage power control method. As another example, if the value of ndrop is above a second threshold2, a second set of $D2D_{offset(i)}$ values will be associated with the value of N (similar to Table 1 above, but optimized to the value of ndrop above threshold2).

In certain embodiments, serving network node 115A may compare the values of N, IoT, and/or ndrop with their respective first and second thresholds to determine the most appropriate in-coverage power control method to be used for adjusting the D2D UE transmit power on its D2D link. To illustrate, consider the following example scenarios. If IoT and ndrop are both below or equal to their respective first thresholds, then the first in-coverage power control method is selected. If the victim network IoT measurement is available and is above the IoT threshold1, however, then the second in-coverage power control method is selected. If the victim network ndrop measurement is available and is above the ndrop threshold1, then the third in-coverage power control method is selected. Note that the second and third in-coverage power control methods can also be selected by signaling a predefined identifier for the second in-coverage power control method and third in-coverage power control method.

After selecting the power control method, serving network node 115A may derive the D2D UE transmit power from the expression of the selected in-coverage power control method, and signal the transmit power level and/or the pre-defined identifier of the selected power control method.

As described above, in certain embodiments a D2D UE, such as D2D UE 110B-1, may be configured with the value of N, IoT and/or ndrop. In such a case, D2D UE 110B-1 may use one or more of the values of N, IoT and/or ndrop to select one of the three power control methods based on one or more pre-defined rules (i.e., by comparing N, IoT and/or ndrop with their respective threshold values), and adjust its power for transmitting signals on D2D link.

As still another example, according to a fourth in-coverage power control method, a D2D UE can transmit at full power if N is less than a defined threshold (as indicated in Table 1), and the victim network IoT and/or ndrop are below a given threshold.

The power control method thresholds described above may be any suitable thresholds, and may vary according to different scenarios. For example, the power control method thresholds described above can vary from the baseline thresholds defined in Table 1 if D2D discovery TDM transmission periods are synchronized versus interleaved between serving cells of the aggressor network.

Figure 4:
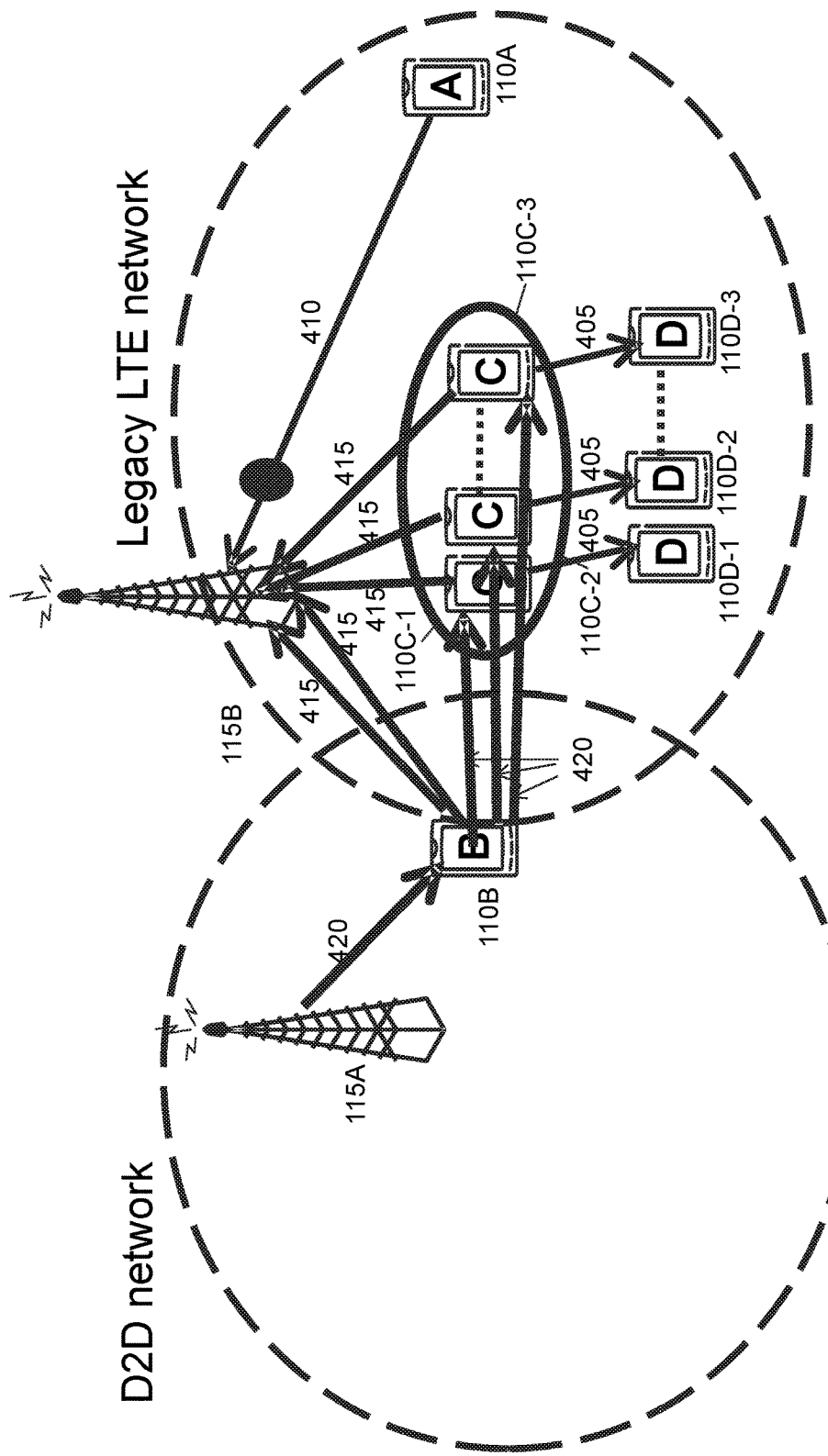
FIG. 4 is a schematic diagram of D2D transmissions in a partial-coverage scenario, in accordance with certain embodiments.

FIG. 4 is a schematic diagram of D2D transmissions in a partial-coverage scenario, in accordance with certain embodiments. More particularly, FIG. 4 illustrates a plurality of wireless devices 110A, 110B, 110C-1, 110C-2, 110C-3, 110D-1, 110D-2, and 110D-3, and network nodes 115A and 115B. Network node 115A may be a serving network node in an aggressor network. Network node 115B may be a network node in a victim network. The network associated with network node 115A may be a D2D network, and the network associated with network node 115B may be a legacy network, such as a legacy LTE network. As shown in FIG. 4, in certain embodiments, D2D UEs 110C-1, 110C-2, 110C-3, 110D-1, 110D-2, and 110D-3 may be in partial coverage with respect to the serving aggressor network. D2D UEs 110C-1, 110C-2, and 110C-3 may communicate desired D2D transmissions 405 to D2D UEs 110D-1, 110D-2, and 110D-3, respectively. The desired D2D transmissions 405 may acts as aggressors or interferers 415 to desired LTE transmissions on the UL. For example, transmission 410 from UE 110A to network node 115B may be interfered with by D2D communication 405. As shown in FIG. 4, D2D UE 110B may serve as a relay node to D2D UEs 110C-1, 110C-2, and 110C-3 using D2D relay signals 420. D2D UEs 110C-1, 110C-2, and 110C-3 may transmit to D2D UE's 110D-1, 110D-2, and 110D-3 in the coverage area of the victim LTE network.

In the scenario illustrated in FIG. 4, the D2D relay signal transmissions 420 of D2D relay node 110B are in coverage of the serving aggressor D2D network associated with network node 115A, with additional D2D UEs 110C-1, 110C-2, 110C-3, 110D-1, 110D-2, and 110D-3 linked through one or more hops from the serving aggressor network node 115A. For example, D2D UEs 110C-1, 110C-2, 110C-3 are linked through a single hop, and D2D UEs 110D-1, 110D-2, and 110D-3 are linked through two hops. Note, however, that more than two hop D2D communication is also possible.

In the partial coverage scenario illustrated in FIG. 4, the number of D2D transmitters can be determined by network node 115A in any suitable manner. For example, network node 115A may determine the number of D2D transmitters based on the knowledge of a first set of D2D UEs under the coverage of the serving aggressor network node and a second set of D2D UEs that are not under the coverage of the serving aggressor network node. The second set of D2D UEs can be determined by the serving network node based on one or more indications received from the first set of D2D UEs.

For example, the first set of D2D UEs, such as D2D UE 110B, may be involved in D2D communication with the second set of D2D UEs, such as D2D UEs 110C-1, 110C-2, 110C-3, and can therefore indicate this to serving network node 115A via the D2D-network link. Serving network node 115A may also determine the second set of D2D UEs based on their pre-determined operation and/or historical data. For example, serving network node 115A may assume based on pre-determined knowledge that the D2D UEs transmit signals at least once with certain periodicity (e.g., once every T1). This communication can be direct for the in-coverage D2D UE's (i.e., first set of D2D UEs) and indirect for the D2D UE's (i.e., second set of D2D UEs) that have only D2D communication link but no direct link with serving network node 115A of the aggressor network. Although the second set of D2D UEs may have no direct link with serving network node 115A, the second set of D2D UEs may be indirectly served or managed by serving network node 115A via the first set of the D2D UEs, such as UE 110B, using one or more hops.

In the partial-coverage scenario illustrated in FIG. 4, the power control methods may be any suitable power control method. Some examples of possible partial-coverage power control methods are described in more detail below.

As a first example, according to a first partial-coverage power control method, the D2D transmit power may be dictated by the number of D2D UE's that are simultaneously transmitting such that the D2D UE transmit power is given by $$P_{D2D} \leq P_0 - N \times D2D_{offset(i)} \quad (6)$$

in which the parameters are defined as described above for equation (1).

In the partial-coverage scenario, the number of simultaneously transmitting UE's N can be the number of D2D UE's in-coverage of the serving aggressor network node, the number of D2D UE's one or more hops removed from the serving network node of the aggressor network, or the total of all of the D2D UE's in partial coverage that are transmitting. It should also be noted that the number of D2D UE's of the aggressor network impacting a given network node of the victim network, such as network node 115B, can be comprised of a number of combinations or clusters of D2D UE's, one or more hops removed from a serving aggressor network node, such as network node 115A. In certain embodiments, different such D2D clusters may be served by different aggressor network nodes and different D2D relay node UEs.

Similar to the description above in relation to the in-coverage scenario, the total number of transmitting D2D UE's can be comprised of a combination of $N_{discovery}$ and $N_{broadcast}$ D2D UEs or a weighted combination of the two values. Furthermore, as per the description above and similar to the approach detailed in Table 1, the value of $D2D_{offset(i)}$ that is selected can be a function of the values of $N_{discovery}$ and $N_{broadcast}$ and the relative thresholds similar to those defined in Table 1, but optimized for the partial-coverage scenario.

Furthermore, as described above, in some cases a cellular UE (i.e., a UE having only radio link(s) with the network node, such as UE 110A) and D2D UEs may share the same resources in time. In such a case, the value of N can also be a weighted combination of the three values $N_{discovery}$, $N_{broadcast}$ and $N_{cellular}$.

As another example, according to a second partial-coverage power control method, the D2D transmit power may be dictated by a combination of the number of D2D UE's that are simultaneously transmitting in the aggressor network cell as well as the IoT as measured by the victim network. As described above, the victim network can signal this IoT value to the aggressor network in any suitable manner. For example, the victim network can signal the IoT value to the aggressor network directly between aggressor network node 115A and victim network node 115 using an X2 interface (or any other suitable internode interface), or indirectly through the respective networks of aggressor network node 115A and victim network node 115B. In this case, the D2D UE transmit power is given by $$P_{D2D} \leq P_0 - N \times D2D_{offset(i)} \times \beta \times IoT \quad (7)$$

in which the parameters are defined as described above in relation to equation (4).

Similar to the second in-coverage power control method described above, the value of $D2D_{offset(i)}$ can be associated with a range of N, for an IoT measurement above a threshold1 (similar to the $D2D_{offset(i)}$ values defined in Table 1 above, but optimized for the range of measured IoT in partial coverage). As described above, if the measured value of IoT is above a second threshold2, a second set of $D2D_{offset(i)}$ values will be employed.

As another example, according to a third partial-coverage power control method, the D2D transmit power may be dictated by a combination of the number of D2D UE's that are simultaneously transmitting in the aggressor network cell, as well as the number of dropped calls ndrop as measured by victim network nodes, such as network node 115B, over a defined interval. The victim network can signal the ndrop value to the aggressor network in any suitable manner. For example, the victim network can signal the ndrop value to the aggressor network directly between aggressor network node 115A and victim network nodes 115B using an X2 interface (or any other suitable internode interface), or indirectly through the respective networks of aggressor network node 115A and victim network node 115B. In this case, the D2D UE transmit power is given by $$P_{D2D} \leq P_0 - N \times D2D_{offset(i)} \times \beta \times n\text{drop} \quad (8)$$

in which the parameters are defined as described above in relation to equation (5).

Similar to the first in-coverage power control method described above, the value of $D2D_{offset(i)}$ can be associated with a range of N, for an ndrop measurement above a threshold1, between a threshold1 and threshold2, or above a threshold3 (similar to the $D2D_{offset(i)}$ values defined in Table 1, but optimized for the range of measured ndrop for the partial scenario).

Figure 5:
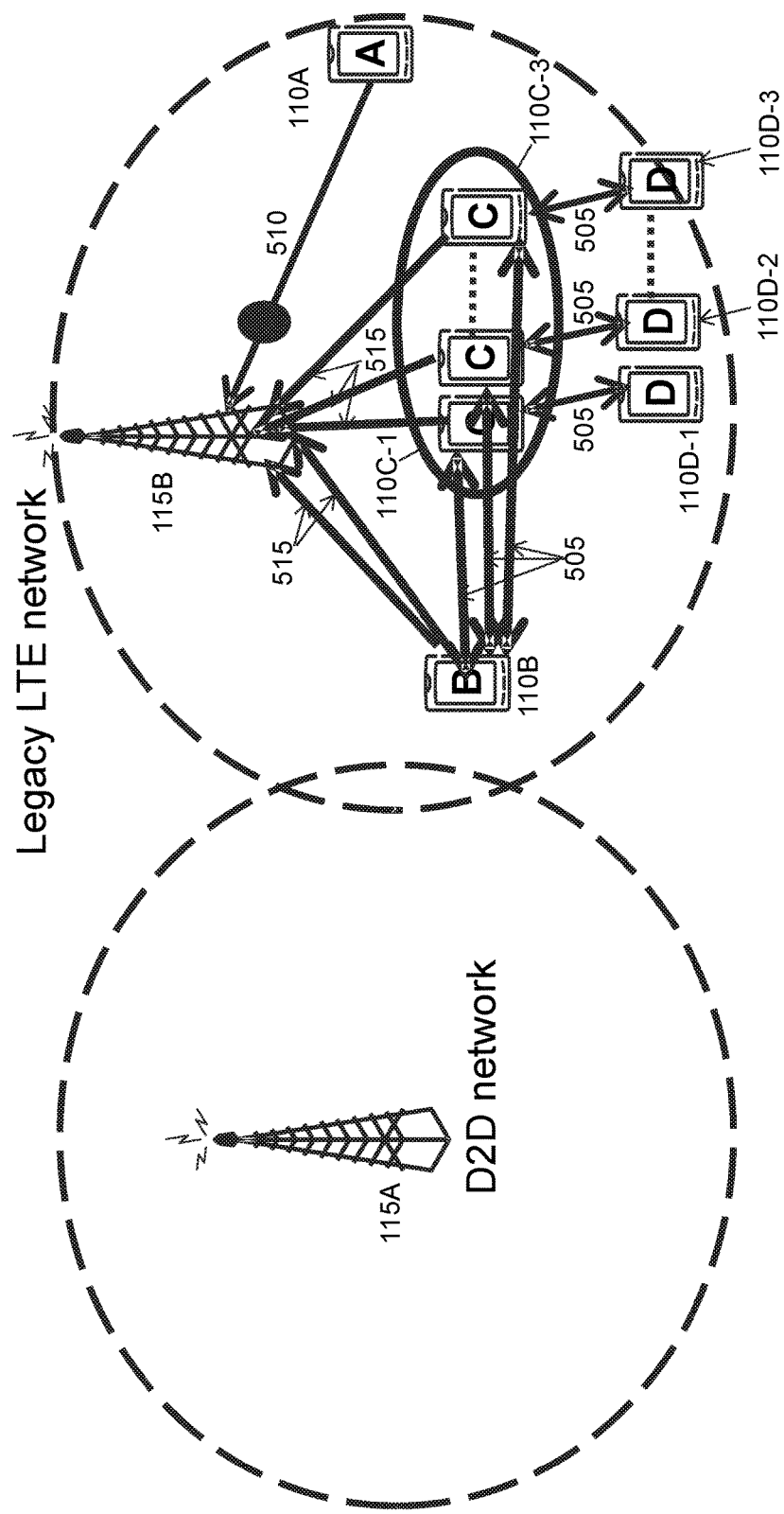
FIG. 5 is a schematic diagram of D2D transmissions in an out-of-coverage scenario, in accordance with certain embodiments.

FIG. 5 is a schematic diagram of D2D transmissions in the out-of-coverage scenario in accordance with certain embodiments. More particularly, FIG. 5 illustrates a plurality of wireless devices 110A, 110B, 110C-1, 110C-2, 110C-3, 110D-1, 110D-2, and 110D-3, and network nodes 115A and 115B. D2D UEs 110C-1, 110C-2, and 110C-3 may communicate desired D2D transmissions 505 to D2D UEs 110D-1, 110D-2, and 110D-3, respectively, and vice versa. The desired D2D transmissions 505 may acts as aggressors or interferers 515 to desired LTE transmissions on the UL. For example, transmission 510 from UE 110A to network node 115B may be interfered with by D2D communication 505. In FIG. 5, the D2D transmissions of the D2D UEs are out-of-coverage of the serving aggressor D2D network node(s) 115A, but co-located with one or more victim network nodes 115B. In certain embodiments, D2D UE 110B serves as a cluster head for D2D UEs 110C-1, 110C-2 and 110C-3, which are also transmitting D2D signals to D2D UEs 110D-1, 110D-2 and 110D-3 as a second hop in the link. A cluster head refers to any D2D UE that provides control or synchronization information to other D2D UEs and does not preclude the use of other terms for the same notion. For example, in certain embodiments D2D UE 110B may be a synchronization node. Alternatively, in certain embodiments D2D UEs 110C-1, 110C-2, and 110C-3 could transmit independently of D2D UEs 110D-1, 110D-2, and 110D-3, and act as cluster heads directly for D2D UEs 110D-1, 110D-2, and 110D-3. Since the D2D UE's are out of coverage with respect to serving network node 115A, they will not be able to receive signaling directly from the serving aggressor network. As an alternative, in certain embodiments the D2D cluster head UEs may set the power control settings.

The D2D cluster head UEs, such as D2D UE 110B or another cluster head UE, may set the power control settings in any suitable manner. For example, in certain embodiments D2D UE 110B or another D2D cluster head UEs may autonomously power control the D2D UE transmissions in the cluster group based on the number of transmitting D2D UEs. As another example, in certain embodiments the D2D cluster head UE may autonomously power control the D2D UE transmissions in the cluster group based on the number of transmitting D2D UEs in combination with receiving IoT or dropped call information by communications with impacted victim network node 115B. The IoT or dropped call information can be obtained by the D2D UE acting as the serving D2D node, such as D2D UE 110B, in any suitable manner. For example, the IoT or dropped call information can be obtained by the D2D UE acting as the serving D2D node based on one or more of information received from other D2D UEs, assessment of D2D UEs operating in the coverage area based on their received signals, and/or pre-determined knowledge of D2D transmissions (e.g., periodic transmissions once per time period, T2).

Thus, in certain embodiments the D2D transmissions may be power controlled based on the number of simultaneous D2D transmissions for the out of coverage scenario as illustrated in FIG. 5. As in the various embodiments above, the D2D transmit power may be dictated by any suitable power control method. Some example power control methods are described in more detail below.

As one example, in certain embodiments the D2D transmit power may be given according to a first out-of-coverage power control method based at least in part on the number of D2D UEs that are simultaneously transmitting. In such a case, the D2D UE transmit power is given by $$P_{D2D} \leq P_0 - N \times D2D_{offset(i)} \quad (9)$$

in which the parameters are defined as described above in equation (1).

In the out-of-coverage scenario, the number of simultaneously transmitting UEs can be the number of D2D UEs that are transmitting and served by the cluster head D2D UE 110B, the number of D2D UEs that are transmitting and are one or more hops removed from cluster head D2D UE 110B, or the total of all of the aggressor network D2D UEs in the out-of-coverage scenario that are transmitting.

The number of D2D UEs of the aggressor network impacting a given network node of the victim network, such as network node 115B, can be comprised of a number of combinations or clusters of D2D UEs, one or more hops removed from a serving aggressor network node, such as network node 115A. Different such D2D clusters can be served by different aggressor cluster head D2D UEs and/or different aggressor network D2D relay node UEs.

Similar to the description above, the total number of transmitting D2D UEs can be comprised of a combination of $N_{discovery}$ and $N_{broadcast}$ D2D UEs or a weighted combination of the two values. Furthermore, as per the description above and similar to the approach detailed in Table 1, the value of $D2D_{offset(i)}$ that is selected can be a function of the values of $N_{discovery}$ and $N_{broadcast}$ and the relative thresholds (similar to those defined in Table 1, but optimized for the out-of-coverage scenario). Furthermore, in some cases a cellular UE (i.e., a UE having only radio link(s) with the network node 115B, such as UE 110A) and D2D UEs may share the same resources in time. In such a case, the value of N can also be a weighted combination of the three values $N_{discovery}$, $N_{broadcast}$ and $N_{cellular}$.

As another example, according to a second out-of-coverage scenario power control method, the D2D transmit power may be dictated by a combination of the number of D2D UEs that are simultaneously transmitting in the aggressor network cell as well as the IoT as measured by the victim network. The victim network can signal this IoT value to the aggressor network out of coverage D2D UEs in any suitable manner. For example, the victim network can signal the IoT value to the aggressor network out of coverage D2D UEs through another D2D UE which can directly or indirectly receive the IoT value. In this case, the D2D UE transmit power is given by $$P_{D2D} \le P_0 - N \times D2D_{offset(i)} \times \beta \times IoT \qquad (10)$$

in which the parameters are defined as described above in relation to equation (4) above.

Similar to the second in-coverage power control method described above, the value of $D2D_{offset(i)}$ can be associated with a range of N, for an IoT measurement above a threshold1 (similar to the $D2D_{offset(i)}$ values defined in Table 1 above, but optimized for the range of measured IoT in the out-of-coverage scenario). As described above, if the measured value of IoT is above a second threshold2, a second set of $D2D_{offset(i)}$ values will be employed. The second set of values may be optimized for the out-of-coverage scenario.

As yet another example, according to a third out-of-coverage power control method, the D2D transmit power may be dictated by a combination of the number of D2D UEs that are simultaneously transmitting in the aggressor network cell as well as the number of dropped calls ndrop as measured by the victim network node(s) 115B over a defined interval. The victim network can signal this ndrop value to the aggressor network out of coverage D2D UEs in any suitable manner. For example, the victim network can signal the ndrop value to the aggressor network out of coverage D2D UEs through another D2D UE which can directly or indirectly receive the IoT value. In this case, the D2D UE transmit power is given by $$P_{D2D} \le P_0 - N \times D2D_{offset(i)} \times \beta \times n\text{drop} \qquad (11)$$

in which the parameters are defined as described above in relation to equation (5).

Similar to the first in-coverage power control method described above, the value of $D2D_{offset(i)}$ can be associated with a range of N, for an ndrop measurement above a threshold1, between a threshold1 and threshold2 or above a threshold3 (similar to the $D2D_{offset(i)}$ values defined in Table 1, but optimized for the range of measured ndrop for the out-of-coverage scenario).

Figure 6:
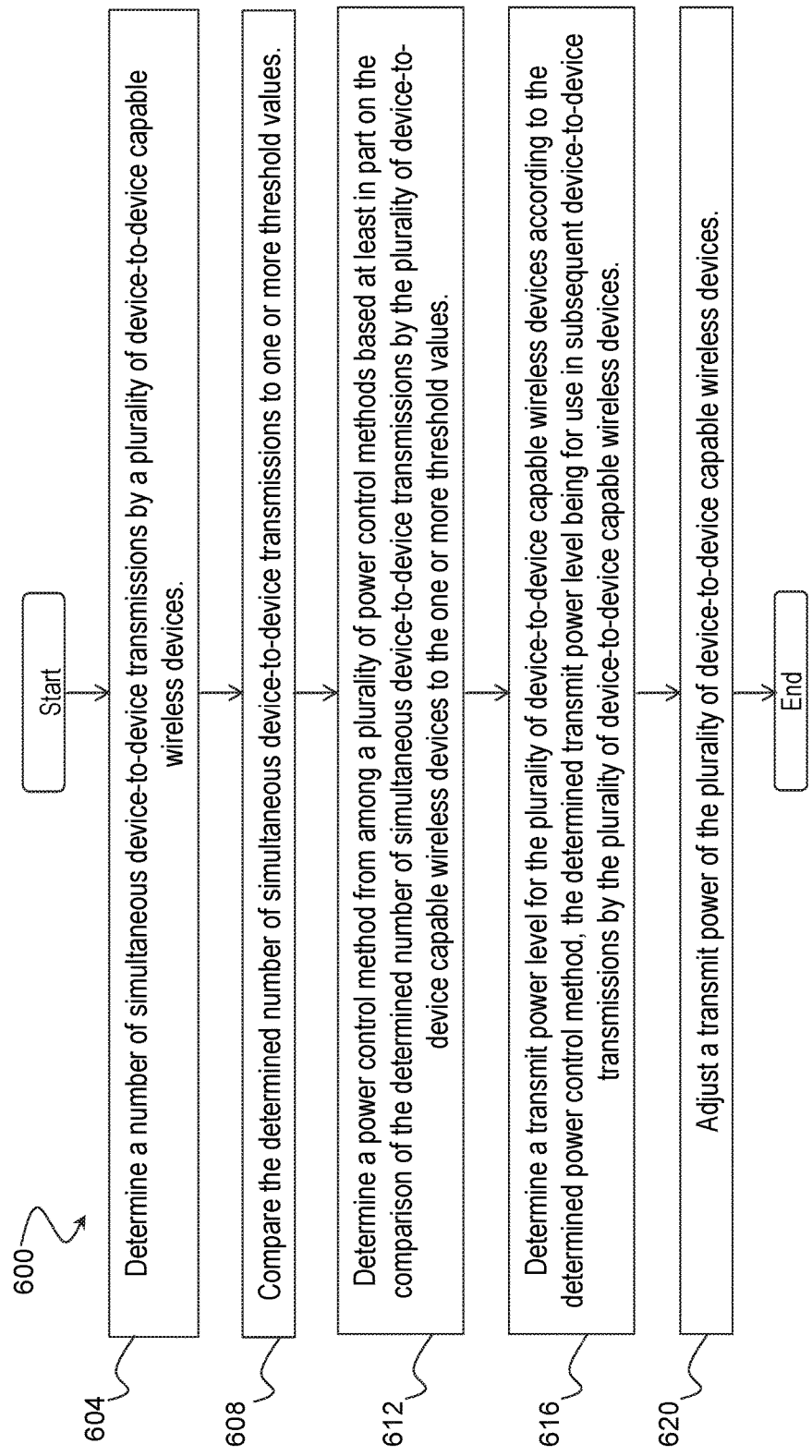
FIG. 6 is a flow chart of a method in a network node, in accordance with an embodiment.

FIG. 6 is a flow chart of a method in a network node, in accordance with an embodiment. The method begins at step 604, where the network node determines a number of simultaneous device-to-device transmissions by a plurality of device-to-device capable wireless devices. The device-to-device transmissions may comprise D2D communication. In certain embodiments, the plurality of device-to-device capable wireless devices may be in a coverage area of the network node. In certain embodiments, at least one of the plurality of device-to-device capable wireless devices may be in a coverage area of a victim network node.

In certain embodiments, the simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. In some embodiments, the simultaneous device-to-device transmissions may comprise a weighted combination of two or more of simultaneous device-to-device discovery transmissions, simultaneous device-to-device broadcast transmissions, and cellular user equipment transmissions using a set of resources also being used by the plurality of device-to-device capable wireless devices.

The simultaneous device-to-device transmissions may comprise one or more of a number of transmissions that at least partially overlap in time, a number of transmissions that fully overlap in time, at least a threshold number of transmissions that at least partially overlap in time during a defined time period, and at least a threshold number of transmissions that fully overlap in time during a defined time period.

At step 608, the network node compares the determined number of simultaneous device-to-device transmissions to one or more threshold values. In certain embodiments, the determined number of simultaneous device-to-device transmissions may be compared to a first threshold, and the method may further comprise obtaining a value of interference rise over thermal as measured by a victim network node, and comparing the value of interference rise over thermal as measured by the victim network node to a second threshold. In certain embodiments, the determined number of simultaneous device-to-device transmissions may be compared to a first threshold, and the method may further comprise obtaining a number of dropped calls as measured by a victim network node, and comparing the number of dropped calls as measured by the victim network node to a third threshold. In certain embodiments, the determined number of simultaneous device-to-device transmissions may be compared to a first threshold. The method may further comprise obtaining a value of interference rise over thermal as measured by a victim network node, comparing the value of interference rise over thermal as measured by the victim network node to a second threshold, obtaining a number of dropped calls as measured by the victim network node, and comparing the number of dropped calls as measured by the victim network node to a third threshold.

At step 612, the network node determines a power control method from among a plurality of power control methods based at least in part on the comparison of the determined number of simultaneous device-to-device transmissions by the plurality of device-to-device capable wireless devices to the one or more threshold values. In certain embodiments, the network node may communicate the determined power control method to the plurality of device-to-device capable wireless devices, the determined power control method for use by the plurality of device-to-device capable wireless devices to adjust a transmit power of subsequent device-to-device transmissions.

Each of the plurality of power control methods may have at least one associated offset value comprising a defined reduction in a transmit power for the plurality of device-to-device capable wireless devices. The plurality of power control methods may comprise at least a first power control method and a second power control method. Determining the power control method from among the plurality of power control methods based at least in part on the comparison of the determined number of simultaneous device-to-device transmissions by the plurality of device-to-device capable wireless devices to the one or more threshold values may comprise selecting the first power control method if the number of simultaneous device-to-device transmissions by the plurality of device-to-device capable wireless devices is above a first threshold, and selecting the second power control method if the number of simultaneous device-to-device transmissions by the plurality of device-to-device capable wireless devices is below the first threshold.

In some embodiments, determining the power control method from among the plurality of power control methods based at least in part on the comparison of the determined number of simultaneous device-to-device transmissions by the plurality of device-to-device capable wireless devices to the one or more threshold values may comprise determining the power control method based at least in part on one or more of an interference rise over thermal as measured by a victim network node and a number of dropped calls as measured by the victim network node.

At step 616, the network node determines a transmit power level for the plurality of device-to-device capable wireless devices according to the determined power control method, the determined transmit power level being for use in subsequent device-to-device transmissions by the plurality of device-to-device capable wireless devices.

At step 620, the network node adjusts a transmit power of the plurality of device-to-device capable wireless devices. In certain embodiments, the method may further comprise configuring the plurality of wireless devices with a predefined identifier for each of the plurality of power control methods.

Figure 7:
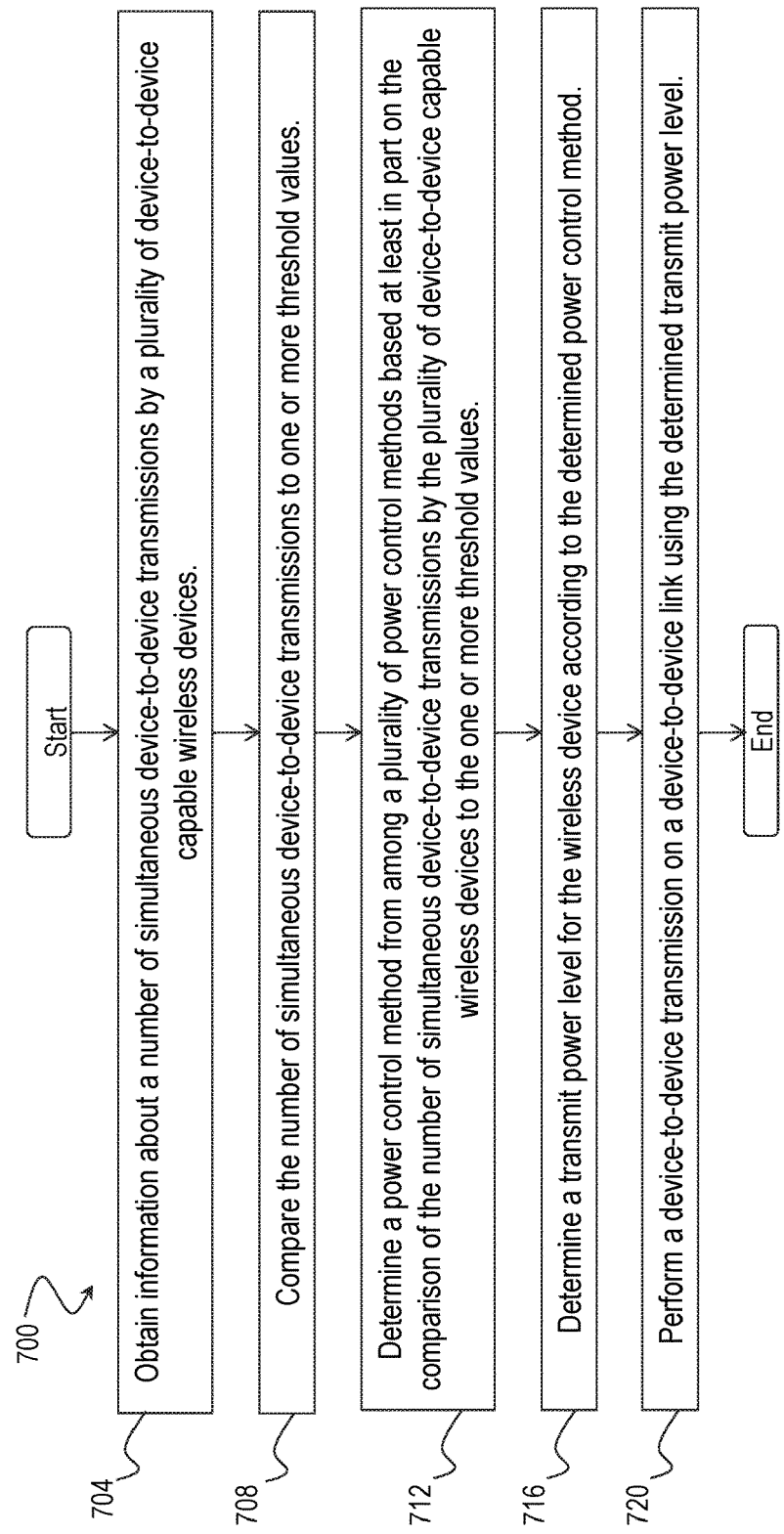
FIG. 7 is a flow chart of a method in a user equipment, in accordance with an embodiment.

FIG. 7 is a flow chart of a method in a wireless device, in accordance with an embodiment. The method begins at step 704, where the wireless device obtains information about a number of simultaneous device-to-device transmissions by a plurality of device-to-device capable wireless devices. The device-to-device transmissions may comprise D2D communication. In certain embodiments, the plurality of device-to-device capable wireless devices may be in a coverage area of a serving network node. In certain embodiments, at least one of the plurality of device-to-device capable wireless devices are in a coverage area of a victim network node.

The simultaneous device-to-device transmissions may comprise one or more of a number of transmissions that at least partially overlap in time, a number of transmissions that fully overlap in time, at least a threshold number of transmissions that at least partially overlap in time during a defined time period, and at least a threshold number of transmissions that fully overlap in time during a defined time period.

In certain embodiments, the simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. The simultaneous device-to-device transmissions may comprise a weighted combination of two or more of simultaneous device-to-device discovery transmissions, simultaneous device-to-device broadcast transmissions, and cellular user equipment transmissions using a set of resources also being used by the plurality of device-to-device capable wireless devices.

At step 708, the wireless device compares the number of simultaneous device-to-device transmissions to one or more threshold values. In certain embodiments, the number of simultaneous device-to-device transmissions is compared to a first threshold; and the method may further comprise obtaining a value of interference rise over thermal as measured by a victim network node, and comparing the value of interference rise over thermal as measured by the victim network node to a second threshold. In certain embodiments, the number of simultaneous device-to-device transmissions is compared to a first threshold, and the method may further comprise obtaining a number of dropped calls as measured by a victim network node, and comparing the number of dropped calls as measured by the victim network node to a third threshold. In certain embodiments, the number of simultaneous device-to-device transmissions may be compared to a first threshold. The method may further comprise obtaining a value of interference rise over thermal as measured by a victim network node, comparing the value of interference rise over thermal as measured by the victim network node to a second threshold, obtaining a number of dropped calls as measured by the victim network node, and comparing the number of dropped calls as measured by the victim network node to a third threshold.

At step 712, the wireless device determines a power control method from among a plurality of power control methods based at least in part on the comparison of the number of simultaneous device-to-device transmissions by the plurality of device-to-device capable wireless devices to the one or more threshold values. Each of the plurality of power control methods may have at least one associated offset value comprising a defined reduction in a transmit power for the wireless device.

In certain embodiments, the plurality of power control methods may comprise at least a first power control method and a second power control method. Determining the power control method from among the plurality of power control methods based at least in part on the comparison of the number of simultaneous device-to-device transmissions by the plurality of device-to-device capable wireless devices to the one or more threshold values may comprise selecting the first power control method if the number of simultaneous device-to-device transmissions by the plurality of device-to-device capable wireless devices is above a first threshold, and selecting the second power control method if the number of simultaneous device-to-device transmissions by the plurality of device-to-device capable wireless devices is below the first threshold. In certain embodiments, determining the power control method from among the plurality of power control methods based at least in part on the comparison of the determined number of simultaneous device-to-device transmissions by the plurality of device-to-device capable wireless devices to the one or more threshold values may comprise determining the power control method based at least in part on one or more of an interference rise over thermal as measured by a victim network node and a number of dropped calls as measured by the victim network node.

At step 716, the wireless device determines a transmit power level for the wireless device according to the determined power control method.

At step 720, the wireless device performs a device-to-device transmission on a device-to-device link using the determined transmit power level.

In certain embodiments, the wireless device may be configured with a predefined identifier for each of the plurality of power control methods. The method may further comprise transmitting at a full power if the number of simultaneous device-to-device transmissions is below the first threshold and one or both of the interference rise over thermal as measured by the victim network node is below the second threshold and the number of dropped calls as measured by the victim network node is below the third threshold.

Figure 8:
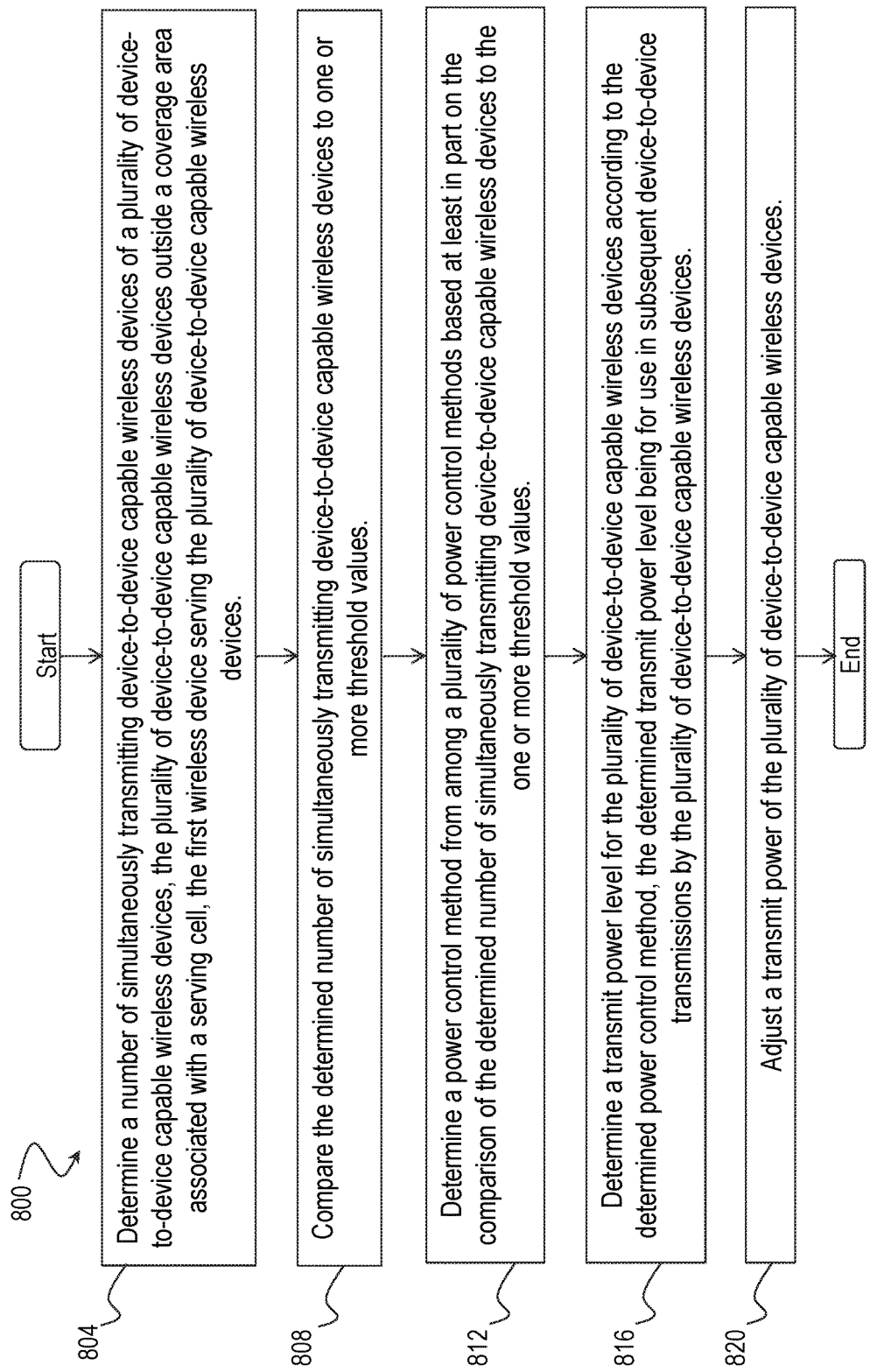
FIG. 8 is a flow chart of a method in a user equipment, in accordance with an embodiment.

FIG. 8 is a flow chart of a method in a first wireless device, in accordance with an embodiment. This method may be primarily applicable to the out-of-coverage scenario described above. The method begins at step 804, where the first wireless device determines a number of simultaneously transmitting device-to-device capable wireless devices of a plurality of device-to-device capable wireless devices, the plurality of device-to-device capable wireless devices outside a coverage area associated with a serving cell, the first wireless device serving the plurality of device-to-device capable wireless devices. In certain embodiments, the number of simultaneously transmitting device-to-device capable wireless devices may comprise one or more of a number of device-to-device capable wireless devices that are transmitting and served by the first wireless device, a number of device-to-device capable wireless devices that are transmitting and are one or more hops from the first wireless device, and a total of all device-to-device capable wireless devices from an aggressor network that are transmitting.

In certain embodiments, the simultaneous device-to-device transmissions may comprise one or more of simultaneous device-to-device discovery transmissions, simultaneous device-to-device broadcast transmissions, and cellular user equipment transmissions using a set of resources also being used by the plurality of device-to-device capable wireless devices. The simultaneous device-to-device transmissions may comprise a weighted combination of two or more of the simultaneous device-to-device discovery transmissions, the simultaneous device-to-device broadcast transmissions, and the cellular user equipment transmissions using a set of resources also being used by the plurality of device-to-device capable wireless devices.

At step 808, the first wireless device compares the determined number of simultaneously transmitting device-to-device capable wireless devices to one or more threshold values. In certain embodiments, the determined number of simultaneously transmitting device-to-device capable wireless devices is compared to a first threshold, and the method further comprises obtaining information about the interference rise over thermal as measured by the victim network node, and comparing the value of interference rise over thermal as measured by the victim network node to a second threshold. The determined number of simultaneously transmitting device-to-device capable wireless devices may be compared to a first threshold, and the method may further comprise obtaining the number of dropped calls as measured by the victim network node, and comparing the number of dropped calls as measured by the victim network node to a second threshold. The determined number of simultaneously transmitting device-to-device capable wireless devices may be compared to a first threshold, and the method may further comprise obtaining the value of interference rise over thermal as measured by the victim network node, comparing the value of interference rise over thermal as measured by the victim network node to a second threshold, obtaining the number of dropped calls as measured by the victim network node, and comparing the number of dropped calls as measured by the victim network node to a third threshold.

At step 812, the first wireless device determines a power control method from among a plurality of power control methods based at least in part on the comparison of the determined number of simultaneously transmitting device-to-device capable wireless devices to the one or more threshold values. Each of the plurality of power control methods may have at least one associated offset value comprising a defined reduction in a transmit power for the plurality of device-to-device capable wireless devices.

In certain embodiments, the method may further comprise communicating the determined power control method to the plurality of device-to-device capable wireless devices, the determined power control method being for use by the plurality of device-to-device capable wireless devices to adjust a transmit power of subsequent device-to-device transmissions.

In certain embodiments, the plurality of power control methods may comprise at least a first power control method and a second power control method. Determining the power control method from among a plurality of power control methods based at least in part on the comparison of the number of simultaneously transmitting device-to-device capable wireless devices to the one or more threshold values may comprise selecting the first power control method if the number of simultaneously transmitting device-to-device capable wireless devices is above a first threshold, and selecting the second power control method if the number of simultaneously transmitting device-to-device capable wireless devices is below the first threshold. Determining the power control method from among a plurality of power control methods based at least in part on the comparison of the determined number of simultaneously transmitting device-to-device capable wireless devices to the one or more threshold values may comprise determining the power control method based at least in part on one or more of an interference rise over thermal as measured by a victim network node and a number of dropped calls as measured by the victim network node.

At step 816, the first wireless device determines a transmit power level for the plurality of device-to-device capable wireless devices according to the determined power control method, the determined transmit power level being for use in subsequent device-to-device transmissions by the plurality of device-to-device capable wireless devices.

At step 820, the first wireless device adjusts a transmit power of the plurality of device-to-device capable wireless devices.

Figure 9:
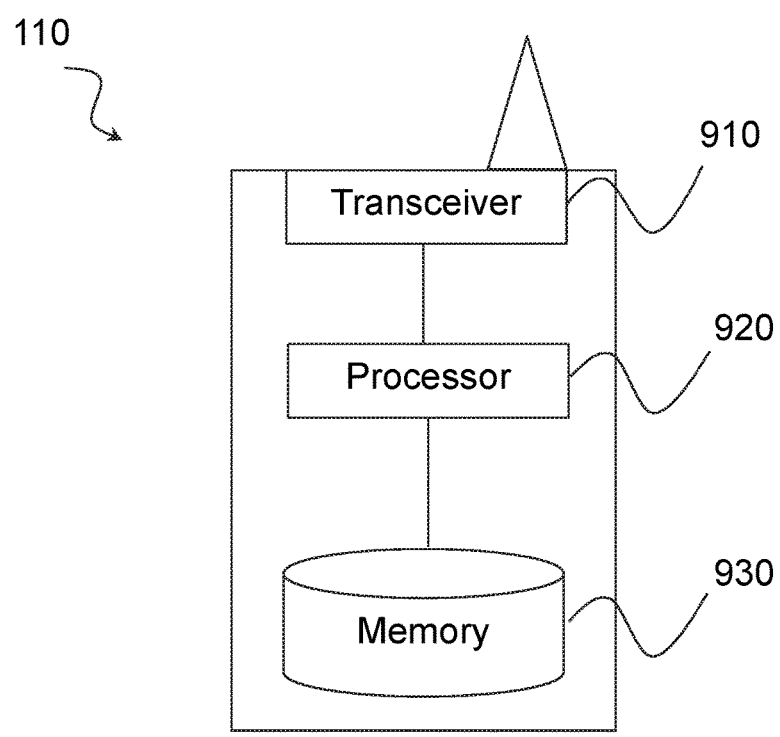
FIG. 9 is a schematic block diagram of an exemplary wireless device, in accordance with certain embodiments.

FIG. 9 is a schematic block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via an antenna), processor 920 executes instructions to provide some or all of the functionality described above as being provided by wireless device 110, and memory 930 stores the instructions executed by processor 920.

One or more of transceiver 910 sub-systems generally includes analog and, in some embodiments, digital components for wirelessly sending and receiving messages to and from base stations or other wireless devices in the cellular communication network. In particular embodiments, the transceiver sub-systems may represent or include RF transceivers, or separate RF transmitters and receivers, capable of transmitting such messages and/or other suitable information wirelessly to base stations or other wireless devices.

Processor 920 may include any suitable combination of hardware and software implemented in one or more modules to execute instructions and manipulate data to perform some or all of the described functions of wireless device 110. In some embodiments, processor 920 may include, for example, one or more computers, one or more central processing units (CPUs), one or more microprocessors, one or more applications, and/or other logic. In particular embodiments, processor 920 may comprise, for example, one or several general-purpose or special-purpose microprocessors or other microcontrollers programmed with suitable software and/or firmware to carry out some or all of the functionality of the wireless devices described herein. In addition or alternatively, processor 920 may comprise various digital hardware blocks (e.g., one or more ASICs, one or more off-the-shelf digital and analog hardware components, or a combination thereof) configured to carry out some or all of the functionality of the wireless devices described herein. Additionally, in particular embodiments, the above described functionality of wireless devices 110 may be implemented, in whole or in part, by processor 920 executing software or other instructions stored on a non-transitory computer-readable medium, such as RAM, ROM, a magnetic storage device, an optical storage device, or any other suitable type of data storage components.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. In certain embodiments, for example, the determining module may compare a number of simultaneous device-to-device transmissions to one or more threshold values, and determine a power control method from among a plurality of power control methods based at least in part on the comparison of the number of simultaneous device-to-device transmissions by the plurality of device-to-device capable wireless devices to the one or more threshold values. As another example, the determining module may determine a transmit power level for the wireless device according to the determined power control method, and perform a device-to-device transmission on a device-to-device link using the determined transmit power level.

In certain embodiments, for example, the determining module may determine a number of simultaneously transmitting device-to-device capable wireless devices of a plurality of device-to-device capable wireless devices. As another example, the determining module may compare the determined number of simultaneously transmitting device-to-device capable wireless devices to one or more threshold values, and determine a power control method from among a plurality of power control methods based at least in part on the comparison of the determined number of simultaneously transmitting device-to-device capable wireless devices to the one or more threshold values. As yet another example, the determining module may determine a transmit power level for the plurality of device-to-device capable wireless devices according to the determined power control method, the determined transmit power level being for use in subsequent device-to-device transmissions by the plurality of device-to-device capable wireless devices, and adjust a transmit power of the plurality of device-to-device capable wireless devices.

The determining module may include or be included in processor 920. The determining module may include analog and/or digital circuitry configured to perform any of the functions of the determining module and/or processor 920. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may communicate the determined power control method to the plurality of device-to-device capable wireless devices, the determined power control method being for use by the plurality of device-to-device capable wireless devices to adjust a transmit power of subsequent device-to-device transmissions. The communication module may include a transmitter and/or a transceiver, such as transceiver 910. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may obtain information about an interference rise over thermal as measured by the victim network node. As another example, the receiving module may obtain information about a number of dropped calls as measured by the victim network node. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 10:
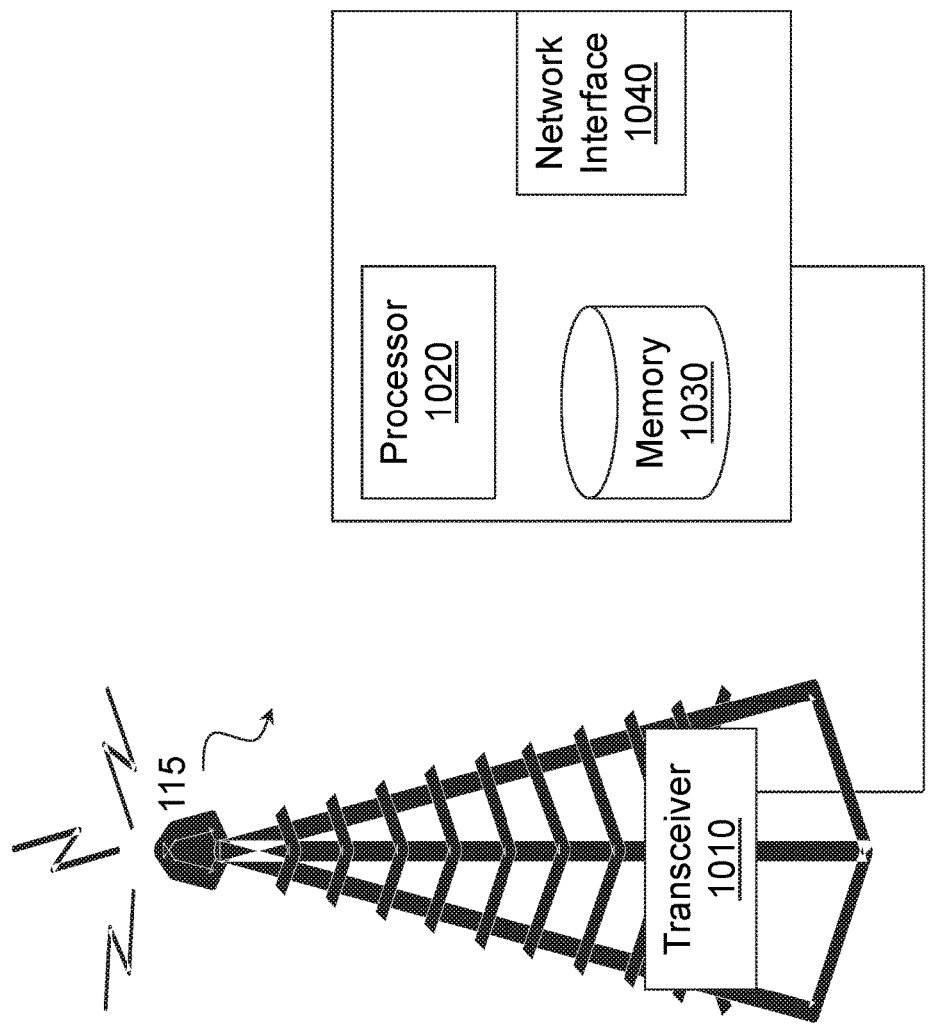
FIG. 10 is a schematic block diagram of an exemplary network node, in accordance with certain embodiments.

FIG. 10 is a schematic block diagram of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via an antenna), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes 130, radio network controllers 120, etc.

At least one of the one or more transceivers 1010 generally includes analog and, in some embodiments, digital components for wirelessly sending and receiving messages to and from wireless devices in the cellular communication network. In particular embodiments, the transceivers may represent or include radio-frequency (RF) transceivers, or separate RF transmitters and receivers, capable of transmitting such messages and/or other suitable information wirelessly to wireless devices such as wireless devices 110.

Processor 1020 may include any suitable combination of hardware and software implemented in one or more modules to execute instructions and manipulate data to perform some or all of the described functions of network node 115. In some embodiments, processor 1020 may include, for example, one or more computers, one or more central processing units (CPUs), one or more microprocessors, one or more applications, and/or other logic. In particular embodiments, processor 1020 may include, for example, one or several general-purpose or special-purpose microprocessors or other microcontrollers programmed with suitable software and/or firmware to carry out some or all of the functionality of network nodes 115 described herein. In addition or alternatively, the processor may include various digital hardware blocks (e.g., one or more Application Specific Integrated Circuits (ASICs), one or more off-the-shelf digital and analog hardware components, or a combination thereof) configured to carry out some or all of the functionality of the base stations described herein. Additionally, in particular embodiments, the above described functionality of network nodes 115 may be implemented, in whole or in part, by the processor executing software or other instructions stored on a non-transitory computer-readable medium, such as random access memory (RAM), read only memory (ROM), a magnetic storage device, an optical storage device, or any other suitable type of data storage components. In general, processor 1020 operates to communicate with wireless devices and potentially other base stations via transceiver 1010.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1020 of FIG. 9. In certain embodiments, the functions of two or more of the various modules may be combined into a single module.

The determining module may perform the processing functions of network node 115. For example, the determining module may determine a number of simultaneous device-to-device transmissions by a plurality of device-to-device capable wireless devices, and compare the determined number of simultaneous device-to-device transmissions to one or more threshold values. As another example, the determining module may determine a power control method from among a plurality of power control methods based at least in part on the comparison of the determined number of simultaneous device-to-device transmissions by the plurality of device-to-device capable wireless devices to the one or more threshold values. As another example, the determining module may determine a transmit power level for the plurality of device to device capable wireless devices according to the determined power control method. As yet another example, the determining module may adjust a transmit power of the plurality of device-to-device capable wireless devices. The determining module may include or be included in processor 1020. The determining module may include analog and/or digital circuitry configured to perform any of the functions of the determining module and/or processor 1020. The functions of the determining module described above may, in certain embodiments, be performed in one or more distinct modules.

The communication module may perform the transmission functions of network node 115. The communication module may transmit messages to one or more of wireless devices 110. For example, the communication module may communicate the determined power control method to the plurality of device-to-device capable wireless devices. The communication module may include a transmitter and/or a transceiver, such as transceiver 1010. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may obtain a value of interference rise over thermal as measured by a victim network node. As another example, the receiving module may obtain a number of dropped calls as measured by the victim network node. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
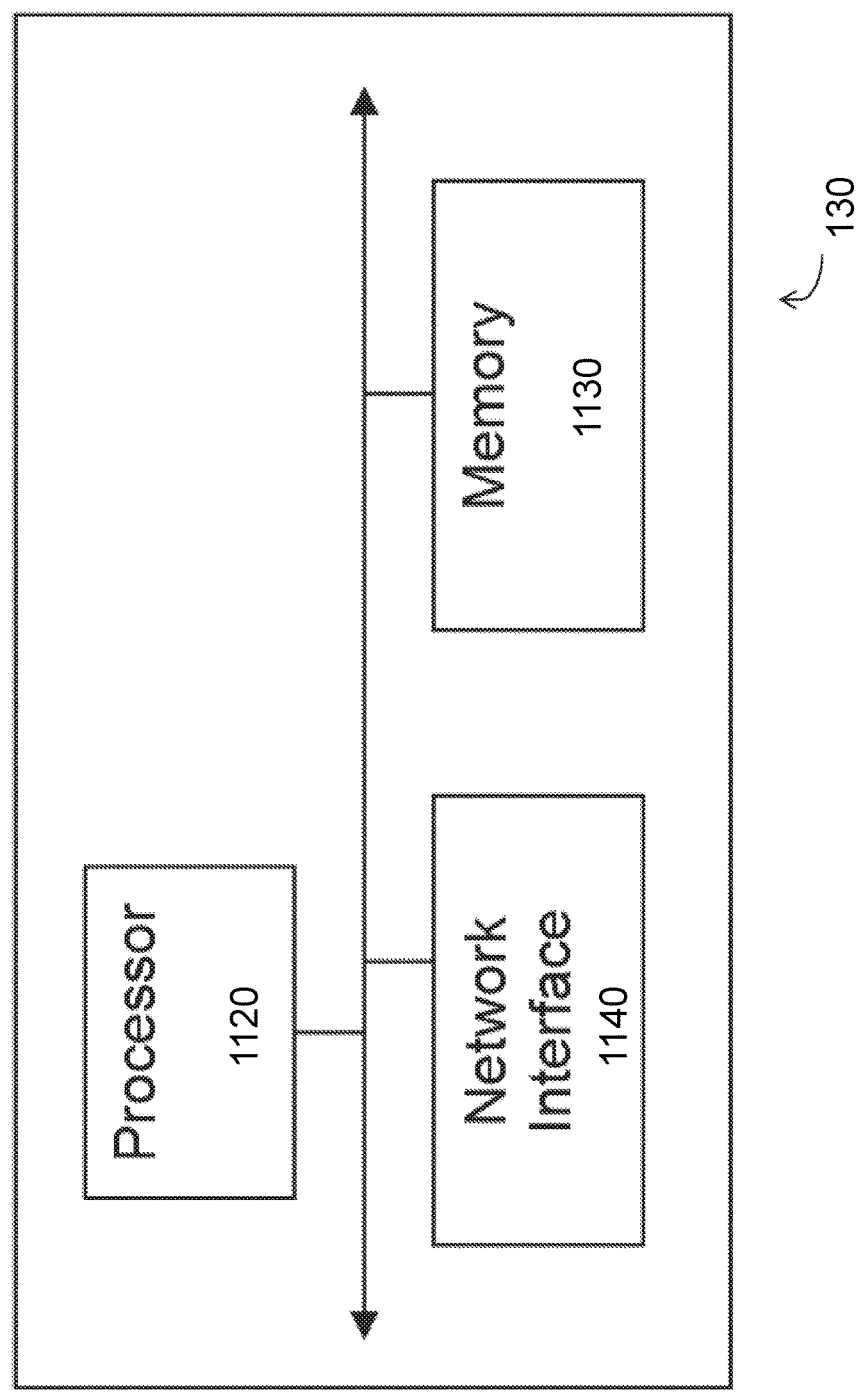
FIG. 11 is a schematic block diagram of an exemplary radio network controller or core network node, in accordance with certain embodiments.

FIG. 11 is a schematic block diagram of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 include processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Embodiments can be implemented in a network node and/or a D2D capable UE. The network node herein can be the serving network node of the D2D UE or any network node with which the D2D UE can establish or maintain a communication link and/or receive information (e.g. via broadcast channel).

The embodiments use a generic term 'network node' that may be any kind of network node. Examples are eNode B, Node B, Base Station, wireless access point (AP), base station controller, radio network controller, relay, donor node controlling relay, base transceiver station (BTS), transmission points, transmission nodes, RRU, RRH, nodes in distributed antenna system (DAS), core network node, MME etc.

The embodiments also use a generic term D2D UE or simply UE. However a D2D UE can be any type of wireless device, which is capable of at least D2D communication through wireless communication. Examples of such D2D UEs are sensor, modem, smart phone, machine type (MTC) device aka machine to machine (M2M) device, PDA, iPAD, Tablet, smart phone, laptop embedded equipped (LEE), laptop mounted equipment (LME), USB dongles etc.

Although terminology from 3GPP LTE (or E-UTRAN) has been used in this disclosure and describes both the serving and victim network nodes, this should not be seen as limiting the scope of the disclosure to only the aforementioned system. Other wireless systems, including WCDMA, UTRA FDD, UTRA TDD, and GSM/GERAN/EDGE, may also benefit from exploiting the ideas covered within this disclosure. Furthermore, the disclosure can apply to scenarios in which the serving and victim nodes employ differing radio access technologies (RATs).

The embodiments are described when a D2D UE is configured to be served by or operate with single carrier (also known as single carrier operation of the UE) for D2D communication or configured to use or operate single carrier in a network node. However the embodiments are applicable for multi-carrier or carrier aggregation based D2D communication.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
DM Discovery Mode
D2D Device-to-Device
DMRS Dedicated Modulation Reference Signal
MCS Modulation and Coding Scheme
RB Resource Block
CMAS Commercial Mobile Alert System
EWS Earthquake and Tsunami Warning System
GNSS Global Navigation Satellite System
GPS Global Positioning System
LTE Long Term Evolution
MME Mobility Management Entity
OFDM Orthogonal Frequency Division Multiplexing
PLMN Public Land Mobile Network
PRB Physical Resource Block
PWS Public Warning System
E-UTRAN Evolution UMTS Terrestrial Radio Access Network
MPR Maximum Power Reduction
A-MPR Additional MPR
WCDMA Wide Band Code Division Multiple Access
OOB Out of Band
RAT Radio Access Technology

The invention claimed is:

1. A method in a network node, comprising:
determining a number of simultaneous device-to-device transmissions by a plurality of device-to-device capable wireless devices;
comparing the determined number of simultaneous device-to-device transmissions to one or more threshold values; and
determining a power control method from among a plurality of power control methods based at least in part on the comparison of the determined number of simultaneous device-to-device transmissions by the plurality of device-to-device capable wireless devices to the one or more threshold values;
wherein:
the plurality of power control methods comprises at least a first power control method and a second power control method; and
determining the power control method from among the plurality of power control methods based at least in part on the comparison of the determined number of simultaneous device-to-device transmissions by the plurality of device to device capable wireless devices to the one or more threshold values comprises:
selecting the first power control method based at least in part on if the number of simultaneous device-to-device transmissions by the plurality of device-to-device capable wireless devices is above a first threshold; and
selecting the second power control method based at least in part on if the number of simultaneous device-to-device transmissions by the plurality of device-to-device capable wireless devices is below the first threshold.

2. The method of claim 1, further comprising:
determining a transmit power level for the plurality of device-to-device capable wireless devices according to the determined power control method, the determined transmit power level being for use in subsequent device-to-device transmissions by the plurality of device-to-device capable wireless devices; and
adjusting a transmit power of the plurality of device-to-device capable wireless devices.

3. The method of claim 1, further comprising:
communicating the determined power control method to the plurality of device-to-device capable wireless devices, the determined power control method being for use by the plurality of device-to-device capable wireless devices to adjust a transmit power of subsequent device-to-device transmissions.

4. The method of claim 1, wherein the simultaneous device-to-device transmissions comprise one or more of:
a number of transmissions that at least partially overlap in time;
a number of transmissions that fully overlap in time;
at least a threshold number of transmissions that at least partially overlap in time during a defined time period; and
at least a threshold number of transmissions that fully overlap in time during a defined time period.

5. The method of claim 1, wherein determining the power control method from among the plurality of power control methods based at least in part on the comparison of the determined number of simultaneous device-to-device transmissions by the plurality of device-to-device capable wireless devices to the one or more threshold values comprises determining the power control method based at least in part on one or more of an interference rise over thermal as measured by a victim network node and a number of dropped calls as measured by the victim network node.

6. The method of claim 1, further comprising configuring the plurality of wireless devices with a predefined identifier for each of the plurality of power control methods.

7. The method of claim 1, wherein each of the plurality of power control methods has at least one associated offset value comprising a defined reduction in a transmit power for the plurality of device-to-device capable wireless devices.

8. The method of claim 1, wherein the simultaneous device-to-device transmissions comprise one or more of:
simultaneous device-to-device discovery transmissions;
simultaneous device-to-device broadcast transmissions; and
cellular user equipment transmissions using a set of resources also being used by the plurality of device-to-device capable wireless devices.

9. The method of claim 8, wherein the simultaneous device-to-device transmissions comprise a weighted combination of two or more of:
simultaneous device-to-device discovery transmissions;
simultaneous device-to-device broadcast transmissions; and
cellular user equipment transmissions using a set of resources also being used by the plurality of device-to-device capable wireless devices.

10. The method of claim 1, wherein:
the determined number of simultaneous device-to-device transmissions is compared to the first threshold; and the method further comprises:
obtaining a value of interference rise over thermal as measured by a victim network node; and
comparing the value of interference rise over thermal as measured by the victim network node to a second threshold.

11. The method of claim 1, wherein
the determined number of simultaneous device-to-device transmissions is compared to the first threshold; and the method further comprises:
obtaining a number of dropped calls as measured by a victim network node; and
comparing the number of dropped calls as measured by the victim network node to a third threshold.

12. The method of claim 1, wherein
the determined number of simultaneous device-to-device transmissions is compared to the first threshold; and the method further comprises:
obtaining a value of interference rise over thermal as measured by a victim network node;
comparing the value of interference rise over thermal as measured by the victim network node to a second threshold;
obtaining a number of dropped calls as measured by the victim network node; and
comparing the number of dropped calls as measured by the victim network node to a third threshold.

13. The method of claim 1, wherein the plurality of device-to-device capable wireless devices are in a coverage area of the network node.

14. The method of claim 1, wherein at least one of the plurality of device-to-device capable wireless devices are in a coverage area of a victim network node.

15. The method of claim 1, wherein none of the device-to-device capable wireless devices are in a coverage area of the network node.

16. The method of claim 1, wherein the device-to-device transmissions comprise D2D communication.

17. A network node, comprising:
one or more processors configured to:
determine a number of simultaneous device-to-device transmissions by a plurality of device-to-device capable wireless devices;
compare the determined number of simultaneous device-to-device transmissions to one or more threshold values; and
determine a power control method from among a plurality of power control methods based at least in part on the comparison of the determined number of simultaneous device-to-device transmissions by the plurality of device-to-device capable wireless devices to the one or more threshold values;
wherein:
the plurality of power control methods comprises at least a first power control method and a second power control method; and
the one or more processors configured to determine the power control method from among the plurality of power control methods based at least in part on the comparison of the determined number of simultaneous device-to-device transmissions by the plurality of device-to-device capable wireless devices to the one or more threshold values comprise one or more processors configured to:
select the first power control method based at least in part on if the number of simultaneous device-to-device transmissions by the plurality of device-to-device capable wireless devices is above a first threshold; and
select the second power control method based at least in part on if the number of simultaneous device-to-device transmissions by the plurality of device-to-device capable wireless devices is below the first threshold.

18. The network node of claim 17, wherein the one or more processors are further configured to:
determine a transmit power level for the plurality of device-to-device capable wireless devices according to the determined power control method, the determined transmit power level being for use in subsequent device-to-device transmissions by the plurality of device-to-device capable wireless devices; and
adjust a transmit power of the plurality of device-to-device capable wireless devices.

19. The network node of claim 17, wherein the one or more processors are further configured to:
communicate the determined power control method to the plurality of device-to-device capable wireless devices, the determined power control method being for use by the plurality of device-to-device capable wireless devices to adjust a transmit power of subsequent device-to-device transmissions.

20. The network node of claim 17, wherein the simultaneous device-to-device transmissions comprise one or more of:
a number of transmissions that at least partially overlap in time;
a number of transmissions that fully overlap in time;
at least a threshold number of transmissions that at least partially overlap in time during a defined time period; and
at least a threshold number of transmissions that fully overlap in time during a defined time period.

21. The network node of claim 17, wherein the one or more processors configured to determine the power control method from among the plurality of power control methods based at least in part on the comparison of the determined number of simultaneous device-to-device transmissions by the plurality of device-to-device capable wireless devices to the one or more threshold values comprise one or more processors configured to determine the power control method based at least in part on one or more of an interference rise over thermal as measured by a victim network node and a number of dropped calls as measured by the victim network node.

22. The network node of claim 17, wherein the one or more processors are further configured to configure the plurality of wireless devices with a predefined identifier for each of the plurality of power control methods.

23. The network node of claim 17, wherein each of the plurality of power control methods has at least one associated offset value comprising a defined reduction in a transmit power for the plurality of device-to-device capable wireless devices.

24. The network node of claim 17, wherein the simultaneous device-to-device transmissions comprise one or more of:
simultaneous device-to-device discovery transmissions;
simultaneous device-to-device broadcast transmissions; and cellular user equipment transmissions using a set of resources also being used by the plurality of device-to-device capable wireless devices.

25. The network node of claim 24, wherein the simultaneous device-to-device transmissions comprise a weighted combination of two or more of:
simultaneous device-to-device discovery transmissions;
simultaneous device-to-device broadcast transmissions; and
cellular user equipment transmissions using a set of resources also being used by the plurality of device-to-device capable wireless devices.

26. The network node of claim 17, wherein:
the one or more processors configured to compare the determined number of simultaneous device-to-device transmissions to one or more threshold values comprise one or more processors configured to compare the determined number of simultaneous device-to-device transmissions to the first threshold; and the one or more processors are further configured to:
obtain a value of interference rise over thermal as measured by a victim network node; and
compare the value of interference rise over thermal as measured by the victim network node to a second threshold.

27. The network node of claim 17, wherein
the one or more processors configured to compare the determined number of simultaneous device-to-device transmissions to one or more threshold values comprise one or more processors configured to compare the determined number of simultaneous device-to-device transmissions to the first threshold; and the one or more processors are further configured to:
obtain a number of dropped calls as measured by a victim network node; and
compare the number of dropped calls as measured by the victim network node to a third threshold.

28. The network node of claim 17, wherein the one or more processors configured to compare the determined number of simultaneous device-to-device transmissions to one or more threshold values comprise one or more processors configured to compare the determined number of simultaneous device-to-device transmissions to the first threshold; and the one or more processors are further configured to:
obtain a value of interference rise over thermal as measured by a victim network node;
compare the value of interference rise over thermal as measured by the victim network node to a second threshold;
obtain a number of dropped calls as measured by the victim network node; and
compare the number of dropped calls as measured by the victim network node to a third threshold.

29. The network node of claim 17, wherein the plurality of device-to-device capable wireless devices are in a coverage area of the network node.

30. The network node of claim 17, wherein at least one of the plurality of device-to-device capable wireless devices are in a coverage area of a victim network node.

31. The network node of claim 17, wherein none of the device-to-device capable wireless devices are in a coverage area of the network node.

32. The network node of claim 17, wherein the device-to-device transmissions comprise D2D communication.

* * * * *